United States Patent
Sun et al.

(10) Patent No.: US 10,667,259 B2
(45) Date of Patent: May 26, 2020

(54) CHANNEL RESERVATION TRANSMISSION SCHEMES IN SHARED RADIO FREQUENCY SPECTRUM

(71) Applicant: QUALCOMM Incorporated, San Diego, CA (US)

(72) Inventors: Jing Sun, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/104,052

(22) Filed: Aug. 16, 2018

(65) Prior Publication Data
US 2019/0059085 A1 Feb. 21, 2019

Related U.S. Application Data

(60) Provisional application No. 62/546,989, filed on Aug. 17, 2017.

(51) Int. Cl.
*H04W 72/04* (2009.01)
*H04W 74/08* (2009.01)
(Continued)

(52) U.S. Cl.
CPC ....... *H04W 72/0446* (2013.01); *H04L 5/0053* (2013.01); *H04L 5/0082* (2013.01);
(Continued)

(58) Field of Classification Search
CPC ............. H04W 72/0445; H04W 16/14; H04W 72/042; H04W 72/1268; H04W 74/0816;
(Continued)

(56) References Cited

U.S. PATENT DOCUMENTS

2015/0250002 A1* 9/2015 Sun .................. H04W 74/0808
370/329
2015/0256219 A1* 9/2015 Linden .............. H04W 56/0015
375/133
(Continued)

FOREIGN PATENT DOCUMENTS

WO WO-2016160528 A1 10/2016

OTHER PUBLICATIONS

International Search Report and Written Opinion—PCT/US2018/046913—ISA/EPO—dated Nov. 21, 2018 (175622WO).

*Primary Examiner* — Duc C Ho
(74) *Attorney, Agent, or Firm* — Holland & Hart LLP/Qualcomm

(57) ABSTRACT

Methods, systems, and devices for wireless communication are described for a channel reservation signal that may be transmitted upon gaining contention-based access to a channel in a shared radio frequency spectrum. The channel reservation signal may include a channel reservation preamble and a channel reservation payload. The channel reservation payload may be formatted with other control channel information transmitted by the transmitter, such as downlink control information (DCI), and aligned with a transmission boundary of the other control channel information. When deployed on a shared medium, a downlink control channel may carry an extra trigger field that may schedule a receiving UE to transmit its own channel reservation signal within an uplink transmission burst.

28 Claims, 19 Drawing Sheets

(51) Int. Cl.
*H04L 27/00* (2006.01)
*H04W 16/14* (2009.01)
*H04L 5/00* (2006.01)
*H04W 72/12* (2009.01)
*H04W 74/00* (2009.01)

(52) U.S. Cl.
CPC ......... *H04L 27/0006* (2013.01); *H04W 16/14* (2013.01); *H04W 72/042* (2013.01); *H04W 72/1268* (2013.01); *H04W 74/0816* (2013.01); *H04W 72/0453* (2013.01); *H04W 74/002* (2013.01)

(58) Field of Classification Search
CPC ............ H04W 72/0453; H04W 74/002; H04L 5/0053; H04L 5/0082; H04L 27/0006
See application file for complete search history.

(56) References Cited

U.S. PATENT DOCUMENTS

| | | |
|---|---|---|
| 2016/0057770 A1 | 2/2016 | Yerramalli et al. |
| 2016/0142192 A1 | 5/2016 | Damnjanovic |
| 2016/0242175 A1* | 8/2016 | Dama .................. H04W 74/08 |
| 2016/0309467 A1 | 10/2016 | Yerramalli et al. |
| 2017/0142592 A1* | 5/2017 | Fischer ................ H04W 16/14 |
| 2018/0049037 A1* | 2/2018 | Lopez-Perez ......... H04W 16/14 |
| 2018/0343589 A1* | 11/2018 | Li ........................ H04W 74/08 |

\* cited by examiner

CHANNEL RESERVATION TRANSMISSION SCHEMES IN SHARED RADIO FREQUENCY SPECTRUM

CROSS REFERENCES

The present Application for Patent claims the benefit of U.S. Provisional Patent Application No. 62/546,989 by Sun et al., entitled "CHANNEL RESERVATION TRANSMISSION SCHEMES IN SHARED RADIO FREQUENCY SPECTRUM," filed Aug. 17, 2017, assigned to the assignee hereof, and expressly incorporated herein.

BACKGROUND

The following relates generally to wireless communication and channel reservation transmission schemes in shared radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support channel reservation transmission schemes in shared radio frequency spectrum. Generally, the described techniques provide for a channel reservation signal that may be transmitted by a transmitter upon gaining contention-based access to a channel in a shared radio frequency spectrum, such as after a listen-before-talk (LBT) procedure. The channel reservation signal may provide a transmission on the channel that may prevent another device from obtaining the channel, and also provide information such as an amount of time that the channel will be occupied by the transmitter. In some cases, the channel reservation signal may include a channel reservation preamble and a channel reservation payload. In some cases, the channel reservation payload may be formatted with other control channel information, such as downlink control information (DCI), and aligned with a transmission boundary of the other control channel information. In some cases, the channel reservation signal may include a trigger that may trigger a user equipment (UE) receiving the trigger to transmit its own channel reservation signal with an uplink transmission.

A method of wireless communication is described. The method may include performing an LBT procedure to identify that a channel in a shared radio frequency spectrum band is available for a first transmission, identifying a time duration that the channel is to be occupied by the first transmission, generating a channel reservation signal having a payload that indicates the time duration, and transmitting the channel reservation signal.

An apparatus for wireless communication is described. The apparatus may include means for performing an LBT procedure to identify that a channel in a shared radio frequency spectrum band is available for a first transmission, means for identifying a time duration that the channel is to be occupied by the first transmission, means for generating a channel reservation signal having a payload that indicates the time duration, and means for transmitting the channel reservation signal.

Another apparatus for wireless communication is described. The apparatus may include a processor, memory in electronic communication with the processor, and instructions stored in the memory. The instructions may be operable to cause the processor to perform an LBT procedure to identify that a channel in a shared radio frequency spectrum band is available for a first transmission, identify a time duration that the channel is to be occupied by the first transmission, generate a channel reservation signal having a payload that indicates the time duration, and transmit the channel reservation signal.

A non-transitory computer readable medium for wireless communication is described. The non-transitory computer-readable medium may include instructions operable to cause a processor to perform an LBT procedure to identify that a channel in a shared radio frequency spectrum band is available for a first transmission, identify a time duration that the channel is to be occupied by the first transmission, generate a channel reservation signal having a payload that indicates the time duration, and transmit the channel reservation signal.

Some examples of the method, apparatus, and non-transitory computer-readable medium described above may further include processes, features, means, or instructions for aligning at least a portion of the channel reservation signal with a boundary (e.g., a symbol boundary) of a control resource set transmission associated with the first transmission. In some examples of the method, apparatus, and non-transitory computer-readable medium described above, the generating of the channel reservation signal includes identifying a channel reservation signal preamble, determining a time difference between a completion of the LBT procedure and the boundary of the control resource set transmission, adjusting a duration of a dynamic cyclic prefix based at least in part on the channel reservation signal preamble and the time difference, and appending the dynamic cyclic prefix and payload to the channel reservation signal preamble.

In some examples of the method, apparatus, and non-transitory computer-readable medium described above, the transmitting the channel reservation signal includes multiplexing the payload with the control resource set transmission. In some examples of the method, apparatus, and non-transitory computer-readable medium described above, the transmitting the channel reservation signal further includes repeating transmitting at least the payload until a transmission of the control resource set transmission associated with the first transmission. Some examples of the method, apparatus, and non-transitory computer-readable medium described above may further include processes, features, means, or instructions for modifying the time duration indicated in the payload for each repeated transmission of the payload.

In some examples of the method, apparatus, and non-transitory computer-readable medium described above, the transmitting the channel reservation signal further comprises multiplexing the payload with a plurality of control resource set transmissions in a transmission opportunity associated with the first transmission.

In some examples of the method, apparatus, and non-transitory computer-readable medium described above, the transmitting the channel reservation signal further comprises transmitting a trigger to a UE to transmit the channel reservation signal in an uplink transmission of the UE that may be associated with the first transmission. In some examples of the method, apparatus, and non-transitory computer-readable medium described above, the trigger to the UE may be transmitted in DCI associated with the first transmission. In some examples of the method, apparatus, and non-transitory computer-readable medium described above, the generating the channel reservation signal further comprises formatting the payload of the channel reservation signal according to a downlink control channel format of the first transmission. In some examples of the method, apparatus, and non-transitory computer-readable medium described above, the generating the channel reservation signal further comprises formatting the payload of the channel reservation signal in a channel reservation DCI field that may be transmitted with other DCI associated with the first transmission.

Some examples of the method, apparatus, and non-transitory computer-readable medium described above may further include processes, features, means, or instructions for transmitting one or more of a search space or payload size associated with the channel reservation DCI. In some examples of the method, apparatus, and non-transitory computer-readable medium described above, one or more of the search space or payload size may be transmitted in radio resource control (RRC) signaling.

A method of wireless communication is described. The method may include identifying that a base station is transmitting a first transmission on a channel in a shared radio frequency spectrum band, receiving a channel reservation signal from the base station, and identifying a time duration that the channel is to be occupied by the first transmission based at least in part on a payload of the channel reservation signal.

An apparatus for wireless communication is described. The apparatus may include means for identifying that a base station is transmitting a first transmission on a channel in a shared radio frequency spectrum band, means for receiving a channel reservation signal from the base station, and means for identifying a time duration that the channel is to be occupied by the first transmission based at least in part on a payload of the channel reservation signal.

Another apparatus for wireless communication is described. The apparatus may include a processor, memory in electronic communication with the processor, and instructions stored in the memory. The instructions may be operable to cause the processor to identify that a base station is transmitting a first transmission on a channel in a shared radio frequency spectrum band, receive a channel reservation signal from the base station, and identify a time duration that the channel is to be occupied by the first transmission based at least in part on a payload of the channel reservation signal.

A non-transitory computer readable medium for wireless communication is described. The non-transitory computer-readable medium may include instructions operable to cause a processor to identify that a base station is transmitting a first transmission on a channel in a shared radio frequency spectrum band, receive a channel reservation signal from the base station, and identify a time duration that the channel is to be occupied by the first transmission based at least in part on a payload of the channel reservation signal.

Some examples of the method, apparatus, and non-transitory computer-readable medium described above may further include processes, features, means, or instructions for discontinuing monitoring the channel for at least a portion of the time duration.

In some examples of the method, apparatus, and non-transitory computer-readable medium described above, the receiving the channel reservation signal further comprises receiving a control resource set transmission from the base station, and demultiplexing the channel reservation signal from the control resource set transmission.

Some examples of the method, apparatus, and non-transitory computer-readable medium described above may further include processes, features, means, or instructions for identifying a trigger that indicates the UE is to transmit at least a portion of the channel reservation signal in an uplink transmission from the UE. Some examples of the method, apparatus, and non-transitory computer-readable medium described above may further include processes, features, means, or instructions for transmitting at least the portion of the channel reservation signal. In some examples of the method, apparatus, and non-transitory computer-readable medium described above, the uplink transmission from the UE may be an uplink burst transmission associated with the first transmission.

Some examples of the method, apparatus, and non-transitory computer-readable medium described above may further include processes, features, means, or instructions for identifying one or more of a search space or payload size associated with channel reservation DCI, and the receiving the channel reservation signal may be based at least in part on one or more of the search space or payload size. In some examples of the method, apparatus, and non-transitory computer-readable medium described above, one or more of the search space or payload size may be received from the base station in RRC signaling.

DETAILED DESCRIPTION

Figure 1:
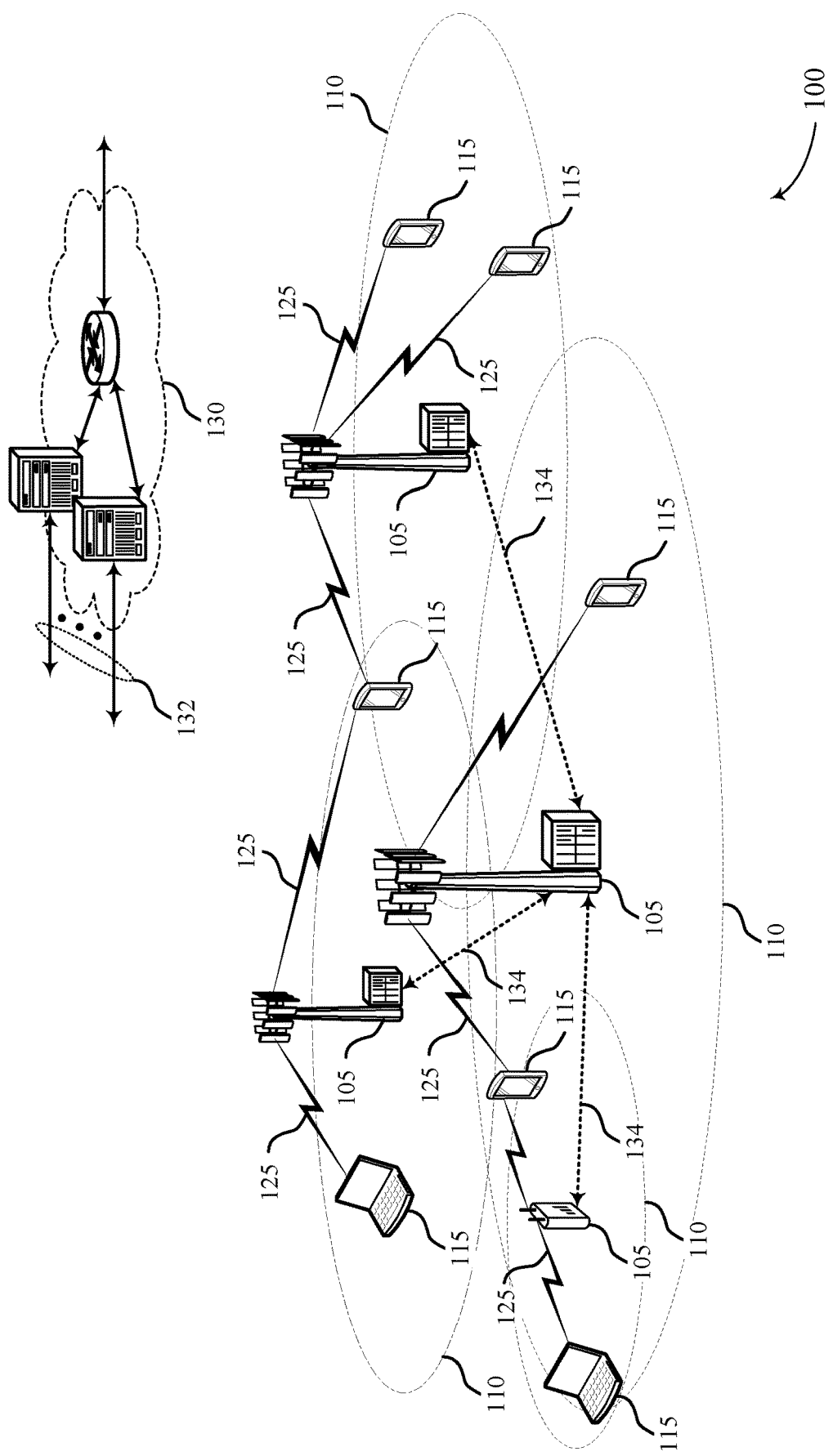
FIG. 1 illustrates an example of a system for wireless communication that supports channel reservation transmission schemes in shared radio frequency spectrum in accordance with aspects of the present disclosure.

In some wireless communications networks, shared radio frequency spectrum may be used for some or all wireless transmissions between wireless network devices. Shared radio frequency spectrum may use contention-based transmission schemes in which a listen-before-talk (LBT) procedure, for example, may be performed by a transmitter to verify that the radio frequency spectrum is not being used by another transmitter. In some deployments, devices that use the wireless communications network may use a synchronized frame structure for downlink and uplink transmissions, and information related to such transmissions may be included in a control resource set (CORESET) that may be transmitted periodically using a physical downlink control channel (PDCCH).

In some cases, a transmitter, such as a base station, may contend for channel access and determine that the channel is available for transmissions, but a first transmission of the synchronized frame structure (e.g., a CORESET transmission) may not be transmitted for some period of time, which may potentially result in a gap between the transmitter obtaining channel access and another device obtaining access to the medium based on an LBT procedure during the gap. Such a situation may result in multiple transmissions interfering with each other, which may reduce network efficiency. Furthermore, in cases where a device of another operator detects transmissions of the base station as part of an LBT procedure, a backoff may be applied prior to a subsequent LBT procedure. If such a device was aware of the period of time that the channel is to be occupied, the subsequent LBT procedure may be performed following the period of time, and excessive backoff may be avoided.

Various techniques discussed herein provide channel reservation signals that may be used to indicate that a channel is occupied by a transmitter, and may indicate a channel occupancy time associated with the transmission or transmission opportunity (TxOP). In some cases, a transmitter, such as a base station, may gain contention-based access to a channel in a shared radio frequency spectrum, such as after an LBT procedure (e.g., a clear channel assessment (CCA)). Upon gaining channel access, the transmitter may transmit the channel reservation signal. In some cases, the channel reservation signal may include a channel reservation preamble and a channel reservation payload. In some cases, a time duration between gaining access to the channel and a first transmission according to a synchronized frame structure (e.g., a CORESET transmission) may be determined, and a duration of a dynamic cyclic prefix may be adjusted to provide that the channel reservation payload is aligned with a control channel transmission (e.g., PDCCH CORESET transmission). In some cases, the channel reservation payload may be retransmitted one or more times to increase the probability of detection by potential aggressors and provide consistent alignment with the control channel transmission.

In some cases, the channel reservation payload may be formatted as channel reservation downlink control information (CR-DCI), and multiplexed with the other control channel information. The channel reservation payload may include, for example, channel occupancy information that may indicate a time duration that the channel is to be occupied by the transmitter. In some cases, the DCI of a regular PDCCH channel may include a trigger field that may trigger a user equipment (UE) receiving the trigger to transmit its own channel reservation signal with an uplink transmission. The channel reservation signal transmitted by UE may reuse the CR-DCI format.

Such a channel reservation signal may help to enhance overall network efficiency by providing a signal on a shared channel during a potential gap between obtaining the channel and a first transmission in a frame structure used by the transmitter, and also by providing an indication of the time duration of the transmission. By transmitting during the potential gap, other nodes or devices that may attempt contention-based channel access are less likely to determine that the channel is available and start transmitting. Thus, potential interfering transmissions may be reduced, thereby enhancing quality of medium sharing. Furthermore, if other nodes or devices (e.g., nodes of another operator that may be using a same radio access technology (RAT) and frame structure) are able to read the channel reservation signal payload, the time duration of the transmission may be determined and can be used to schedule a subsequent LBT procedure at the other node or device. Such other nodes or devices may thus reduce excessive backoff times that may otherwise be used in contention-based access schemes, which may also help to enhance overall network efficiency and reuse factor of the shared spectrum.

Aspects of the disclosure are initially described in the context of a wireless communications system. Various examples of channel reservation signals are then illustrated and described. Aspects of the disclosure are further illustrated by and described with reference to apparatus diagrams, system diagrams, and flowcharts that relate to channel reservation transmission schemes in shared radio frequency spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. The base stations 105 and UEs 115 may communicate over shared radio frequency spectrum for at least a portion of their communications, and may use channel reservation signal transmissions for such transmissions in accordance with various techniques discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed or shared radio frequency spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both. In some cases, a channel reservation signal may be transmitted following an LBT procedure in accordance with techniques discussed herein.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In some cases, a base station 105 or a UE 115 operating in shared radio frequency spectrum may transmit a channel reservation signal upon gaining contention-based access to a channel in the shared radio frequency spectrum (e.g., following an LBT procedure). The channel reservation signal may provide a transmission on the channel that may prevent another device from obtaining the channel, and also provide information such as an amount of time that the channel will be occupied by the transmitter. In some cases, the channel reservation signal may include a channel reservation preamble and a channel reservation payload.

Figure 2:
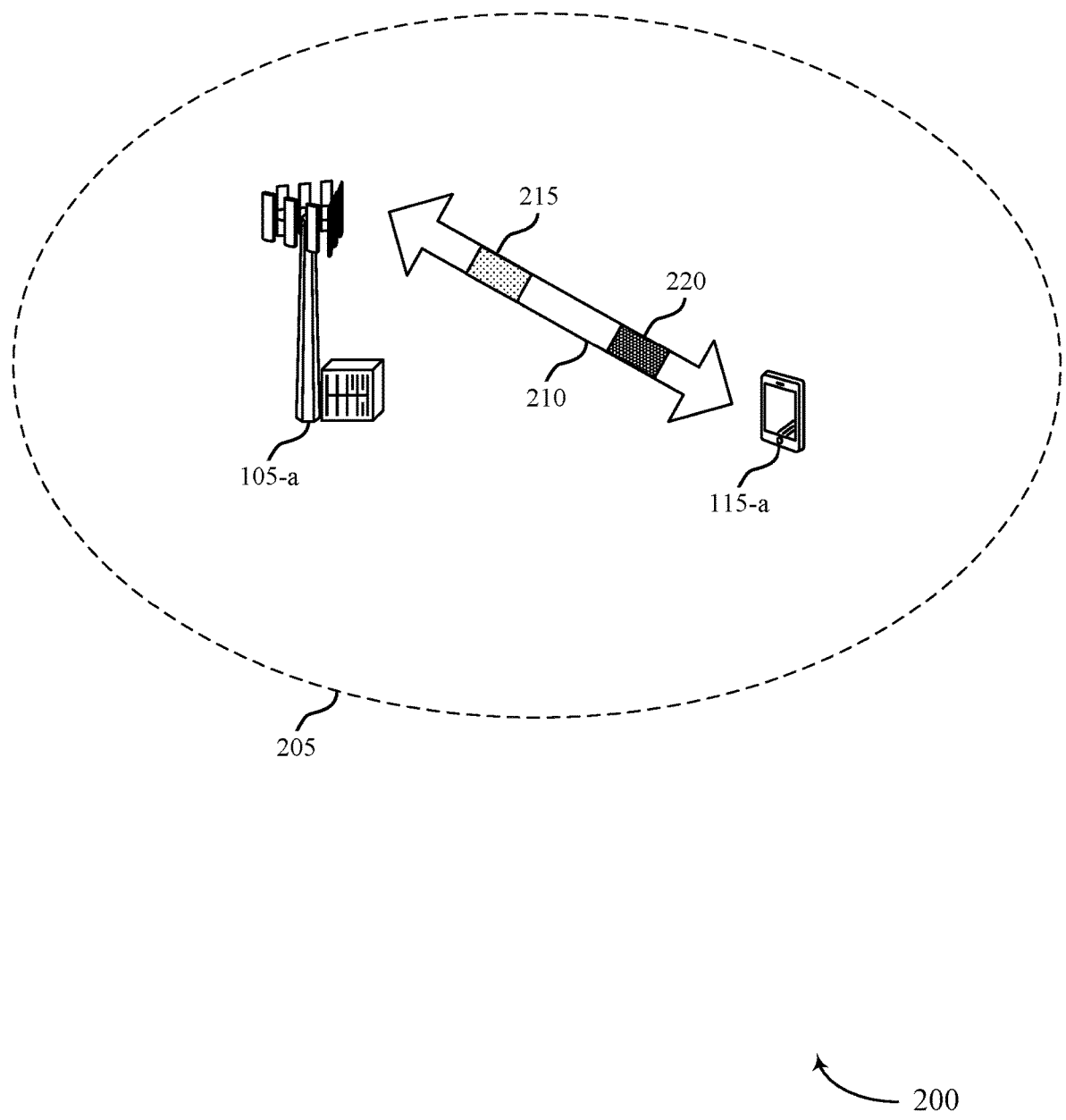
FIG. 2 illustrates an example of a portion of a wireless communications system that supports channel reservation transmission schemes in shared radio frequency spectrum in accordance with aspects of the present disclosure.

FIG. 2 illustrates an example of a portion of a wireless communications system 200 that supports channel reservation transmission schemes in shared radio frequency spectrum in accordance with various aspects of the present disclosure. In some examples, wireless communications system 200 may implement aspects of wireless communications system 100. Wireless communications system 200 may include a base station 105-a and a UE 115-a, which may be examples of the corresponding devices described with reference to FIG. 1.

In some examples, base station 105-a may be in communication with one or more UEs 115 within geographic coverage area 205. For example, base station 105-a may be in communication with UE 115-a via bidirectional communication link 210. The base station 105-a and UE 115-a may use, in some cases, shared radio frequency spectrum for bidirectional communication link 210, and may perform contention-based access procedures prior to transmissions, such as an LBT procedure. Base station 105-a may transmit one or more downlink transmissions, which may include downlink channel reservation signals 220, and UE 115-a may transmit one or more uplink transmissions, which also may include uplink channel reservation signals 215. The channel reservation signals 215 and 220 may provide a transmission on the channel that may prevent another device from obtaining the channel, and also provide information such as an amount of time that the channel will be occupied. In some cases, the channel reservation signal may include a channel reservation preamble and a channel reservation payload.

In some cases, the base station 105-a and the UE 115-a may communicate according to a synchronized frame structure (e.g., and LTE or NR frame structure), and a time duration between gaining access to the channel and a first transmission according to the synchronized frame structure (e.g., a CORESET transmission) may be determined, and a duration of a dynamic cyclic prefix may be adjusted to provide that the channel reservation payload is aligned with a control channel transmission (e.g., PDCCH CORESET transmission). In some cases, the channel reservation payload may be retransmitted one or more times to provide alignment with the control channel transmission. In some cases, the channel reservation payload may be formatted with other control channel information, such as downlink control information (DCI), and multiplexed with the other control channel information. The channel reservation payload may include, for example, channel occupancy information that may indicate a time duration that the channel is to be occupied. In some cases, the downlink channel reservation signal 220 may include a trigger that may trigger the UE 115-a to transmit uplink channel reservation signal 215 with an uplink transmission.

Figure 3:
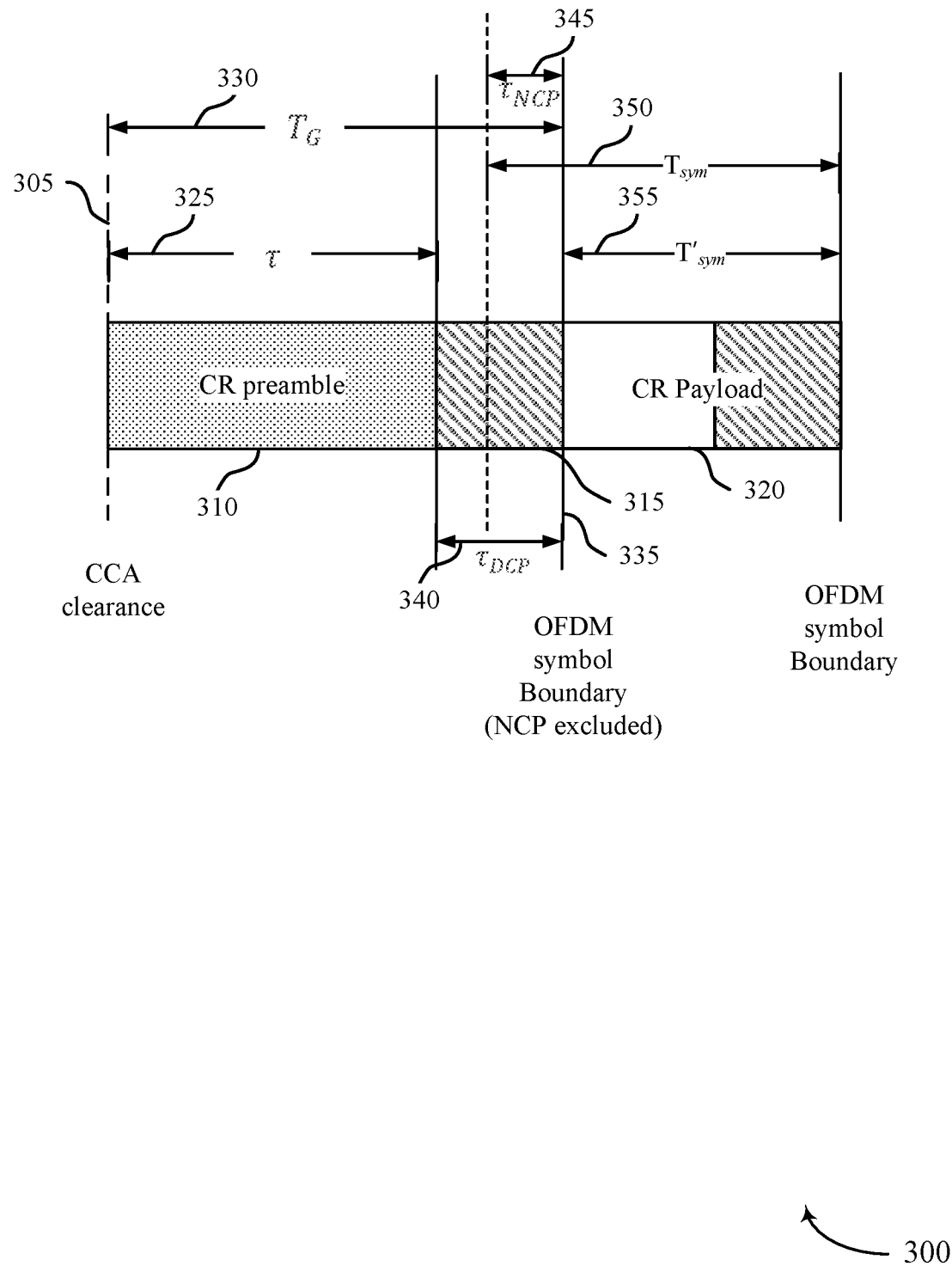
FIG. 3 illustrates an example of a channel reservation signal that supports channel reservation transmission schemes in shared radio frequency spectrum in accordance with aspects of the present disclosure.

FIG. 3 illustrates an example of a channel reservation signal 300 that supports channel reservation transmission schemes in shared radio frequency spectrum in accordance with various aspects of the present disclosure. In some examples, channel reservation signal 300 may implement aspects of wireless communications systems 100 or 200.

The channel reservation signal 300, in some cases, may be transmitted following a CCA clearance 305 (or other contention-based channel access procedure). The channel reservation signal 300 may include a channel reservation (CR) preamble 310, a dynamic cyclic prefix 315, and a CR payload 320. The CR preamble 310 may be a fixed duration preamble having a defined preamble sequence, for example. The fixed duration may be for a preamble time period 325, identified as $\tau$ in FIG. 3. In some cases, the CR payload 320 may be transmitted at a time that aligns with symbol boundaries of control channel transmissions (e.g., PDCCH CORESET transmissions), and a time gap 330 ($T_G$) may be identified between the CCA clearance 305 and the CR payload start time 335. In order to account for time variations between the CCA clearance 305 and the CR payload start time 335, a dynamic cyclic prefix (DCP) time duration 340 ($\tau_{DCP}$) may be determined as $\tau_{DGP}=T_G-\tau$. The dynamic cyclic prefix 315 may thus have a time duration that is longer than a normal cyclic prefix (NCP) time duration 345 ($\tau_{NCP}$). A CR payload time duration 355 ($T'_{sym}$) may be a total symbol duration 350 ($T_{sym}$) less the NCP time duration 345, namely $T'_{sym}=T_{sym}-\tau_{NCP}$. By adjusting the DCP time duration 340 in such a manner, a symbol boundary of the CR payload 320 may be aligned with the transmission timeline for a serving cell (e.g., a transmission timeline of NR data/control channels). In some cases, the CR payload 320 uses a PDCCH design of the serving cell, such as a NR PDCCH design, where channel reservation information (e.g., a channel occupancy time) may be carried in a DCI element (e.g., a CR-DCI) within the PDCCH transmission. Such a CR payload may thus be multiplexed with the PDCCH transmission. In some cases, as will be discussed in more detail below, the channel reservation information in the CR payload may include a trigger for a UE transmission of the CR signal (e.g., a one-bit trigger indication appended to a DCI field of a PDCCH transmission).

The PDCCH design, as indicated above, may provide transmissions of a control resource set (CORESET) that may be monitored by a received (e.g., a UE or base station). Information in CORESET transmissions may be RRC configured, and may include channel reservation DCI (CR-DCI) with, for example, time/frequency locations of CR-DCI and time opportunities for DCI (e.g., certain symbols in a frame, or every symbol to allow flexibility). A search space for CR information in the DCI may also be RRC configured and may be, for example, one or more decoding candidates for blind decoding. In some cases, a single decoding candidate may be provided to limit blind decoding complexity. The size of the CR-DCI may be RRC configured or fixed by specification. In some cases, CR-DCI may be shared with other DCIs in a CORESET transmission. In some cases, the size of CR-DCI is relatively small, and may be transmitted using a relatively small aggregation level.

Figure 4:
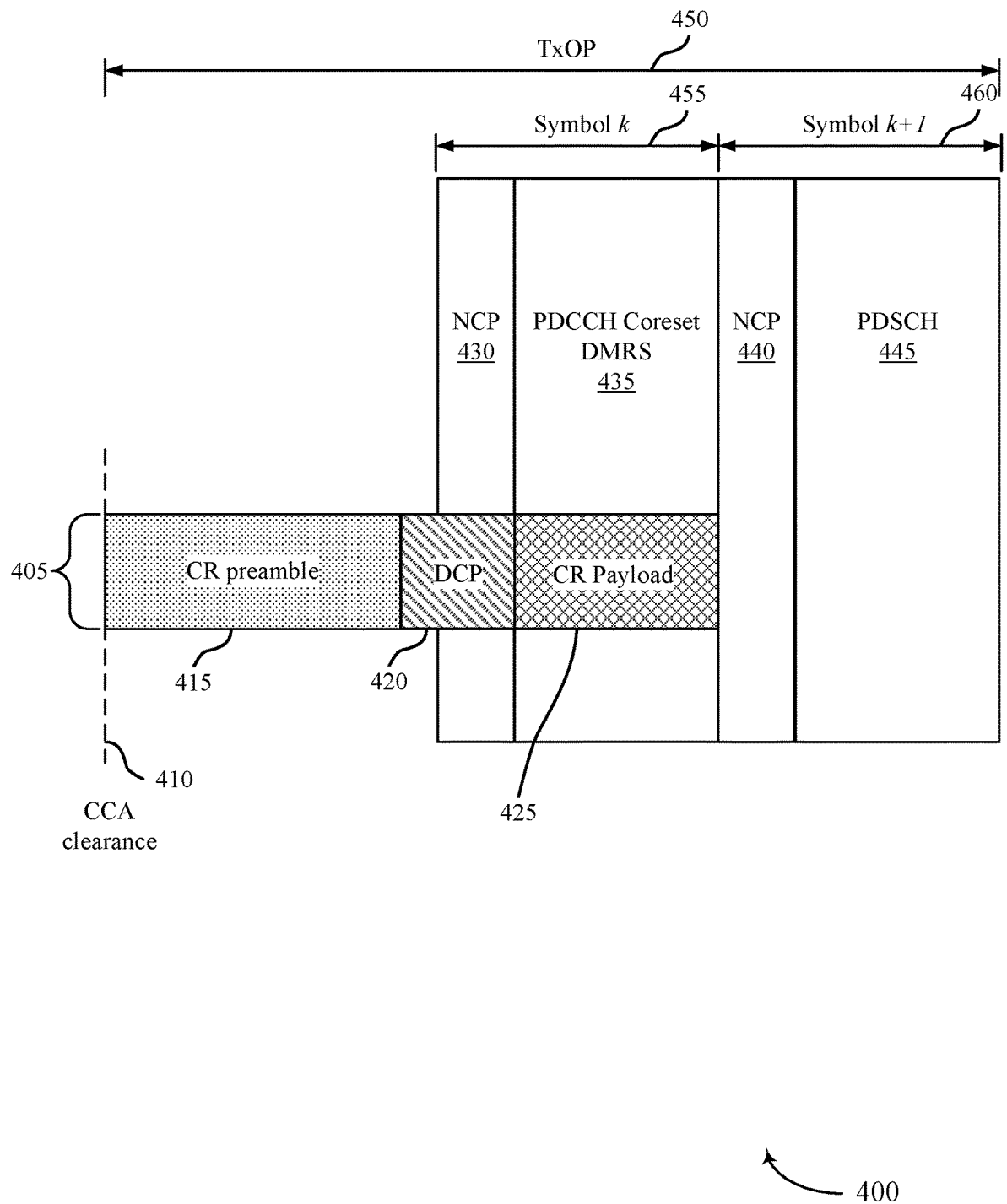
FIG. 4 illustrates an example of channel reservation transmissions that support channel reservation transmission schemes in shared radio frequency spectrum in accordance with aspects of the present disclosure.

FIG. 4 illustrates an example of channel reservation transmissions 400 that support channel reservation transmission schemes in shared radio frequency spectrum in accordance with various aspects of the present disclosure. In some examples, channel reservation transmissions 400 may be implemented by aspects of wireless communications systems 100 or 200. Channel reservation transmissions 400 may include a channel reservation signal 405, a portion of which may be multiplexed with downlink control channel transmissions.

Figure 5:
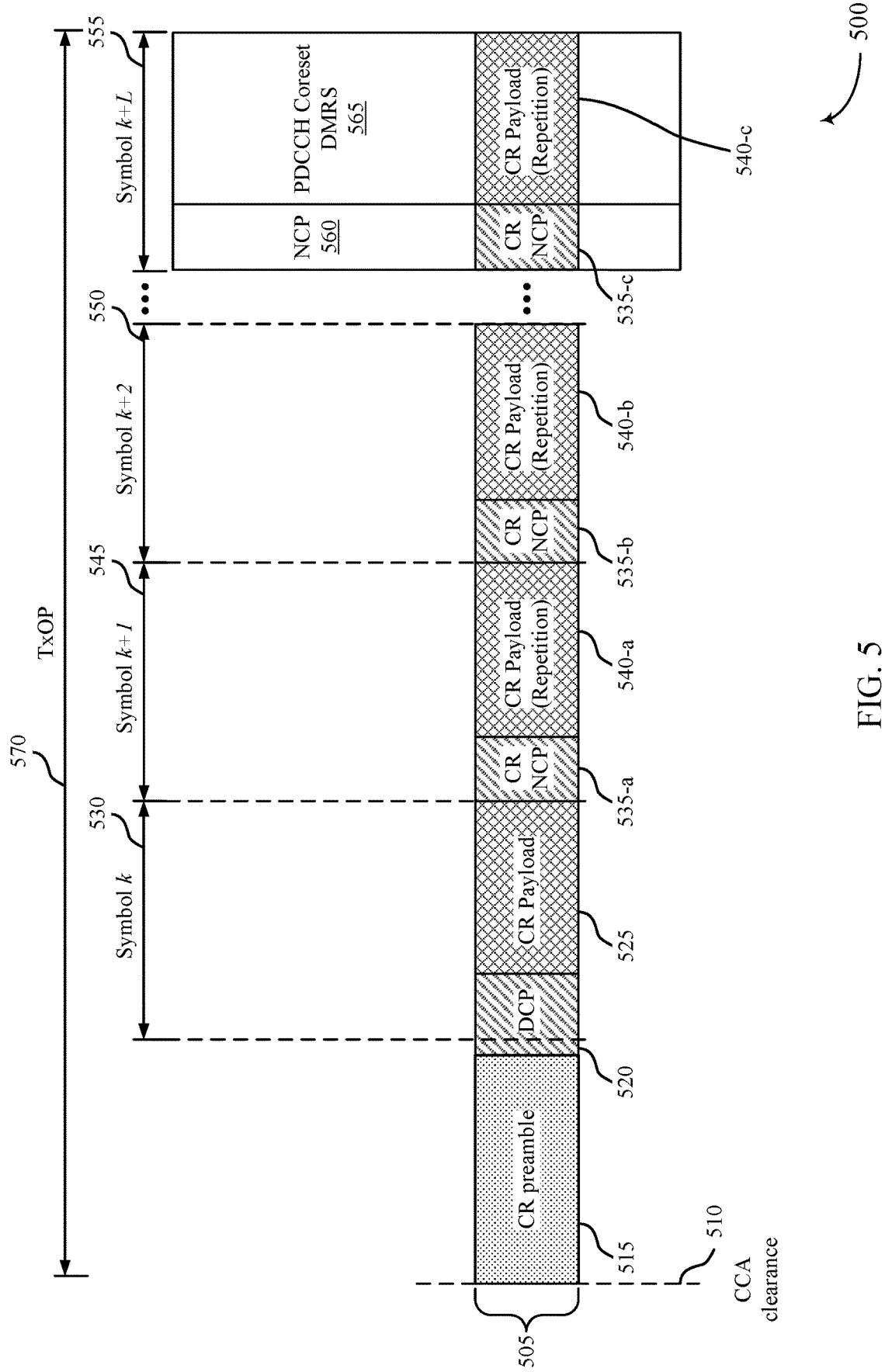
FIG. 5 illustrates another example of channel reservation transmissions that support channel reservation transmission schemes in shared radio frequency spectrum in accordance with aspects of the present disclosure.

In the example of FIG. 4, a base station (e.g., base station 105 of FIG. 1 or 2) may determine a CCA clearance 410 for a TxOP 450, and begin transmitting CR preamble 415, which ends prior to the start of symbol k 455. A PDCCH CORESET 435 is configured for transmission in symbol k 455, which may be monitored by a UE (e.g., a UE 115 of FIG. 1 or 2). A duration of a dynamic cyclic prefix 420 may be determined by the base station, such that the CR payload 425 starts following the normal cyclic prefix 430 and is aligned with the start of the PDCCH CORESET 435, and ends prior to a subsequent normal cyclic prefix 440 and physical downlink shared channel (PDSCH) transmission 445 of a subsequent symbol k+1 460. Thus, the CR payload 425 can be multiplexed directly with PDCCH waveform using the dynamic cyclic prefix 420 duration. In the example of FIG. 4, the PDCCH CORESET 435 transmission starts relatively quickly following CCA clearance 410, and thus the gap between CCA clearance 410 and symbol k is relatively small and may be occupied by the CR preamble 415 and dynamic cyclic prefix 420. In other cases, a relatively large gap may be present before a PDCCH CORESET 435 transmission that may be too large to be accommodated with the dynamic cyclic prefix 420, such as a gap that may span a duration of multiple symbols. FIG. 5 illustrates an example of such a gap.

FIG. 5 illustrates another example of channel reservation transmissions 500 that supports channel reservation transmission schemes in shared radio frequency spectrum in accordance with various aspects of the present disclosure. In some examples, channel reservation transmissions 500 may be implemented by aspects of wireless communications systems 100 or 200. Channel reservation transmissions 500 may include a channel reservation signal 505, a portion of which may be multiplexed with downlink control channel transmissions.

In the example of FIG. 5, a base station (e.g., base station 105 of FIG. 1 or 2) may determine a CCA clearance 510 for a TxOP 570, and begin transmitting CR preamble 515, which ends prior to the start of symbol k 530. A CR payload 525 may be transmitted, with a DCP 520 having a duration such that the end of the CR payload 525 is aligned with a symbol boundary between symbol k 530 and symbol k+1 545. In this example, a multi-symbol gap may be present between CCA clearance 510 and a PDCCH CORESET 565 transmission at symbol k+L 555. The base station may transmit repeated CR NCPs 535 and CR payloads 540 in symbol k+1 545 and symbol k+2 550, and any additional symbols up to PDCCH CORESET 565 transmission at symbol k+L 555. At symbol k+L 555 the base station may transmit CR NCP 535-c during normal cyclic prefix 560, and a final repetition of CR payload 540-a multiplexed with PDCCH CORESET 565 transmission. Thus, in this example, the CR payload symbol with a normal cyclic prefix (NCP) is repeated until the occurrence of PDCCH CORESET 565. In some examples, the initial CR payload 525 may include a channel occupancy time that corresponds to a duration of TxOP 570, and each subsequent repeated CR payload 540 may decrement this channel occupancy time by a duration corresponding to a symbol duration.

When such a CR signal 505 is received at, for example, a neighbor cell UE, the neighbor cell UE may perform preamble detection for the CR preamble and may determine a timing reference for decoding the initial CR payload 525. The neighbor cell UE may then decode the CR-DCI carried by CR payload 525 and identify a channel occupancy time, which may be used to adjust a backoff for monitoring for transmissions of a neighbor cell base station that serves the neighbor cell UE. When such a CR signal 505 is received by a neighbor cell base station, preamble detection again may be performed to obtain timing information for the initial CR payload 525. The neighbor cell base station also may be aware of a known timing difference between base stations, and may derive the symbol boundaries of the CR transmitter and monitor CR payload transmissions 540 using the derived timeline.

Figure 6:
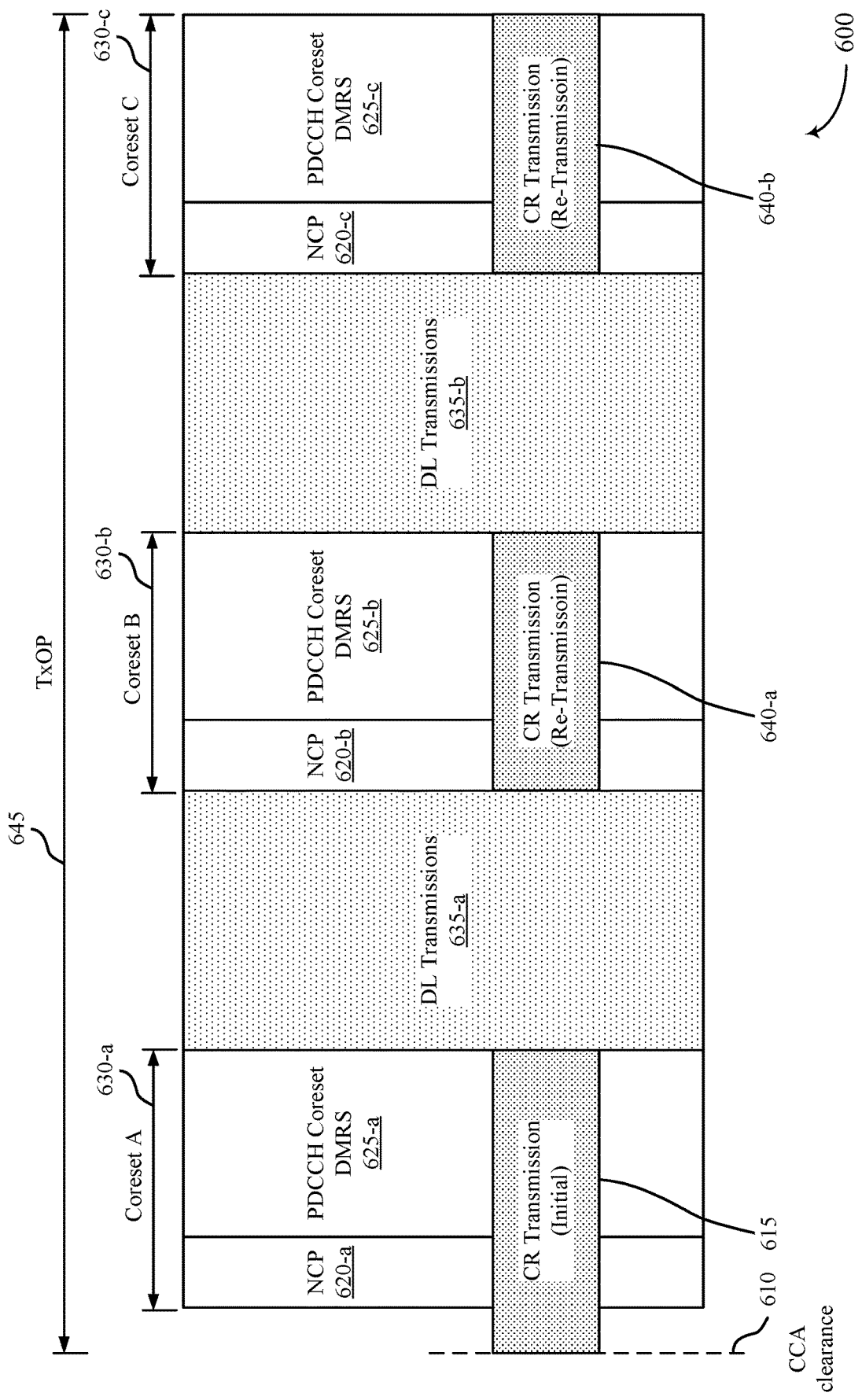
FIG. 6 illustrates another example of channel reservation transmissions that support channel reservation transmission schemes in shared radio frequency spectrum in accordance with aspects of the present disclosure.

FIG. 6 illustrates another example of channel reservation transmissions 600 that support channel reservation transmission schemes in shared radio frequency spectrum in accordance with various aspects of the present disclosure. In some examples, channel reservation transmissions 600 may be implemented by aspects of wireless communications systems 100 or 200. In this example, a base station (e.g., base station 105 of FIG. 1 or 2) may determine a CCA clearance 610 for a TxOP 645, transmit an initial CR transmission 615 in a first PDCCH CORESET 625-a in a first symbol 630-a. The initial CR transmission 615 may be transmitted using a DCP that overlaps NCP 620-a, and may have multiple repetitions such as discussed above with respect to FIGS. 4 and 5.

In this example, during one or more other PDCCH CORESET 625 transmissions, the base station may transmit repeated CR signals and the re-transmitted CR signal 640 is multiplexed with the synchronized PDCCH CORESET 625 transmissions. Other downlink transmissions 635 (e.g., PDSCH transmissions) may be transmitted between PDCCH CORESET 625 transmissions. In some cases, a timing reference provided in the CR preamble can be used to decode the CR-DCI in each CR transmission. This, channel reservation information can be obtained on a synchronized timeline with one or more of the multiple PDCCH CORESET 625 transmissions.

Figure 7:
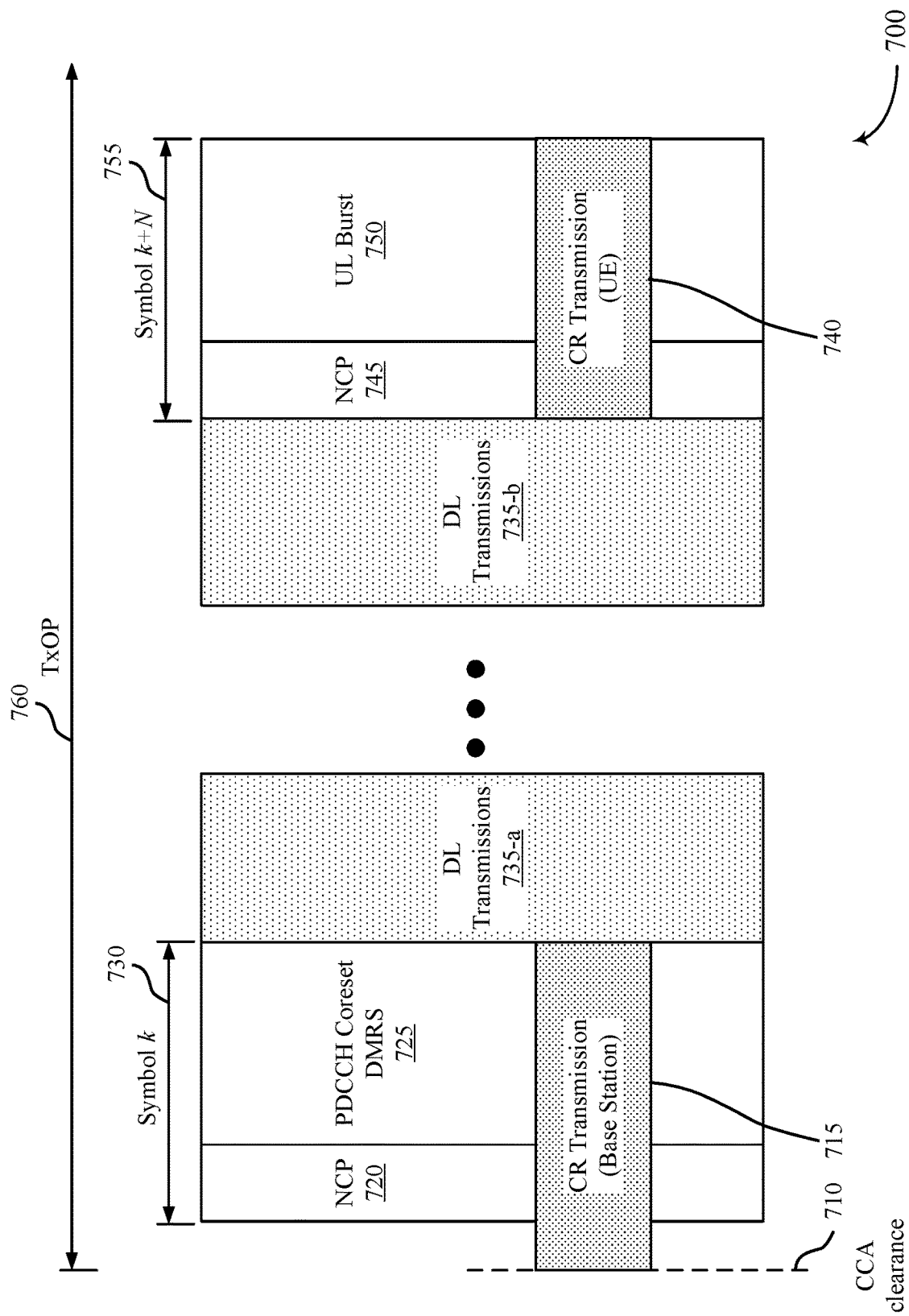
FIG. 7 illustrates an example of an uplink channel reservation transmission that supports channel reservation transmission schemes in shared radio frequency spectrum in accordance with aspects of the present disclosure.

FIG. 7 illustrates an example of an uplink channel reservation transmission 700 that supports channel reservation transmission schemes in shared radio frequency spectrum in accordance with various aspects of the present disclosure. In some examples, uplink channel reservation transmission 700 may be implemented by aspects of wireless communications systems 100 or 200. As indicated above, in some cases a base station may trigger a UE to transmit an uplink channel reservation signal. In some cases, such as in some NR systems, a frame structure may include a downlink portion followed by an uplink burst. In this example, a base station (e.g., base station 105 of FIG. 1 or 2) may determine a CCA clearance 710 for a TxOP 760, transmit an initial CR transmission 715 in a first PDCCH CORESET 725 in a first symbol 730 (symbol k). The initial CR transmission 715 may be transmitted using a DCP that overlaps NCP 720 and a CR payload multiplexed with PDCCH CORESET 725, and may have multiple repetitions before or within downlink transmissions 735 such as discussed above with respect to FIGS. 4 through 6. In some cases, both the initial CR transmission and the associated PDCCH symbol can use DCP.

In this example, the CR-DCI of the CR payload may include a trigger indication that may indicate that the UE is to transmit a CR transmission 740 during an uplink burst transmission in symbol k+N 755. Such an uplink CR transmission 740 by the UE may have a cyclic prefix corresponding to NCP 745, and a CR payload that may be multiplexed with transmissions in uplink burst 750. In some cases, the trigger indication may be a one-bit information element that is appended to a DCI field in the CR payload. In such cases, both the base station and the UE transmit CR signals individually at different times. Other nodes may identify any of the CR signals and determine channel occupancy time, for example.

Figure 8:
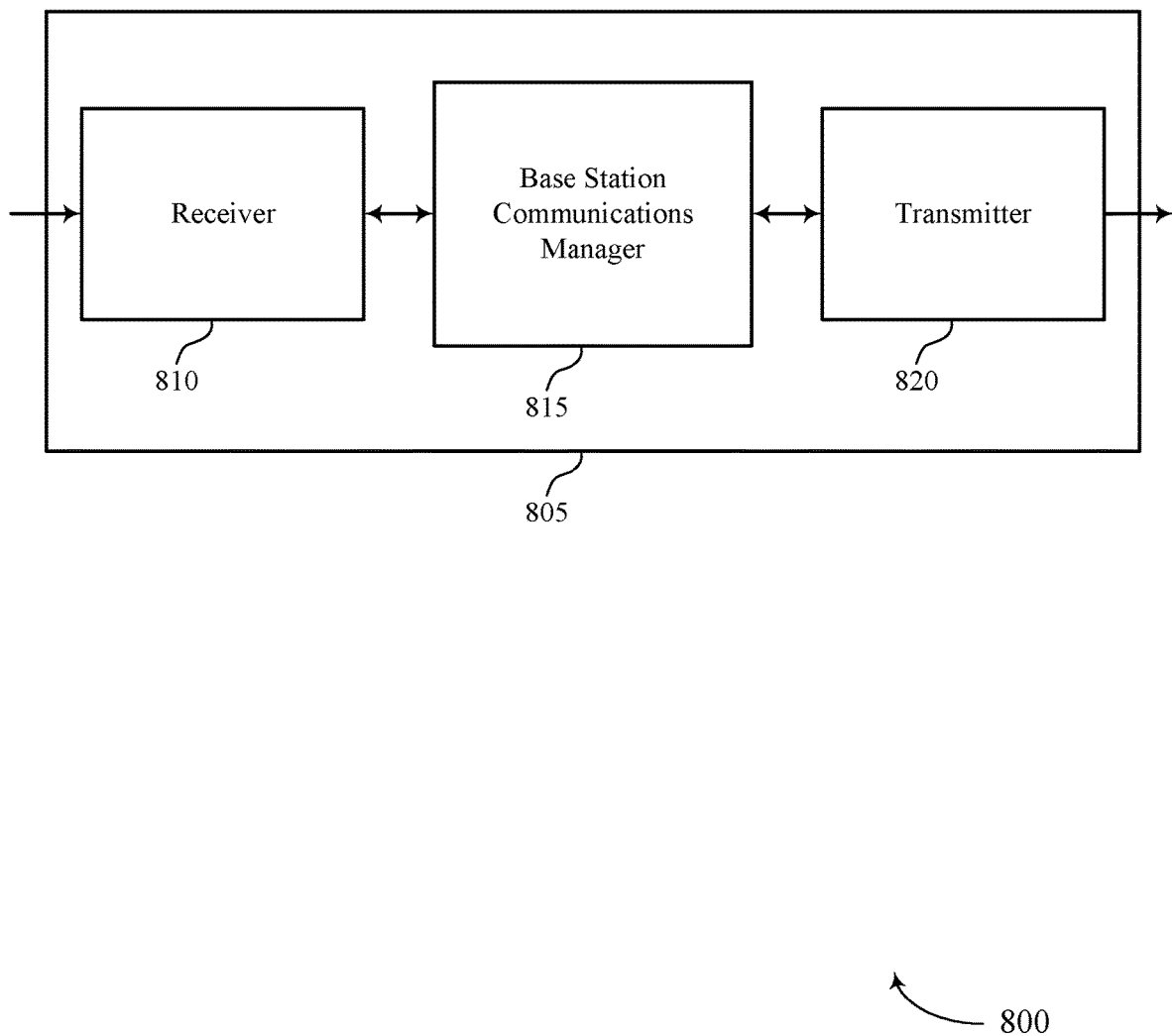
FIGS. 8 through 10 show block diagrams of a device that supports channel reservation transmission schemes in shared radio frequency spectrum in accordance with aspects of the present disclosure.

FIG. 8 shows a block diagram 800 of a wireless device 805 that supports channel reservation transmission schemes in shared radio frequency spectrum in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to channel reservation transmission schemes in shared radio frequency spectrum, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11.

Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may perform an LBT procedure to identify that a channel in a shared radio frequency spectrum band is available for a first transmission, identify a time duration that the channel is to be occupied by the first transmission, generate a channel reservation signal having a payload that indicates the time duration, and transmit the channel reservation signal.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
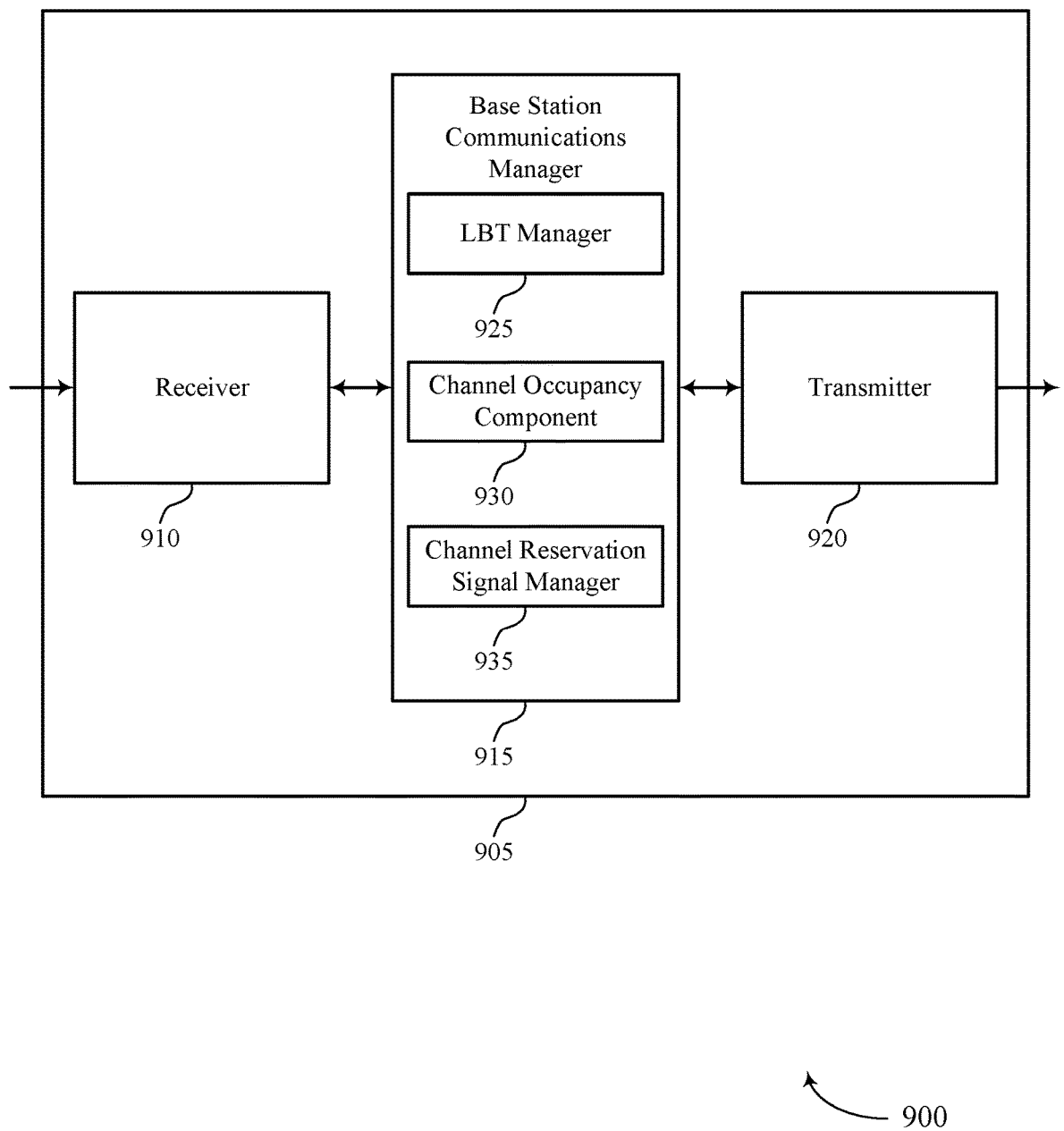

FIG. 9 shows a block diagram 900 of a wireless device 905 that supports channel reservation transmission schemes in shared radio frequency spectrum in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to channel reservation transmission schemes in shared radio frequency spectrum, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include LBT manager 925, channel occupancy component 930, and channel reservation signal manager 935.

LBT manager 925 may perform an LBT procedure to identify that a channel in a shared radio frequency spectrum band is available for a first transmission. LBT manager 925 may, for example, perform a CCA to determine that the channel is available for transmissions. Channel occupancy component 930 may identify a time duration that the channel is to be occupied by the first transmission. The time duration may be identified, for example, based on a number of transmission frames or transmission time intervals (TTIs) that may be present in a transmission opportunity (TxOP).

Channel reservation signal manager 935 may generate a channel reservation signal having a payload that indicates the time duration, and transmit the channel reservation signal. In some cases, channel reservation signal manager 935 may align at least a portion of the channel reservation signal with a boundary of a control resource set (CORESET) transmission associated with the first transmission. In some cases, channel reservation signal manager 935 may transmit repeated versions of the channel reservation signal, and modify the time duration indicated in the payload for each repeated transmission of the payload. In some cases, the generating the channel reservation signal further includes identifying a channel reservation signal preamble, determining a time difference between a completion of the LBT procedure and the boundary of the control resource set transmission, adjusting a duration of a dynamic cyclic prefix based on the channel reservation signal preamble and the time difference, and appending the dynamic cyclic prefix and payload to the channel reservation signal preamble. In some cases, the transmitting the channel reservation signal further includes repeating transmitting at least the payload until a transmission of the control resource set transmission associated with the first transmission. In some cases, the generating the channel reservation signal further includes formatting the payload of the channel reservation signal according to a downlink control channel format of the first transmission. In some cases, the generating the channel reservation signal further includes formatting the payload of the channel reservation signal in a channel reservation DCI field that is transmitted with other DCI associated with the first transmission.

Transmitter 920 may transmit signals generated by other components of the device. In some examples, the transmitter

920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
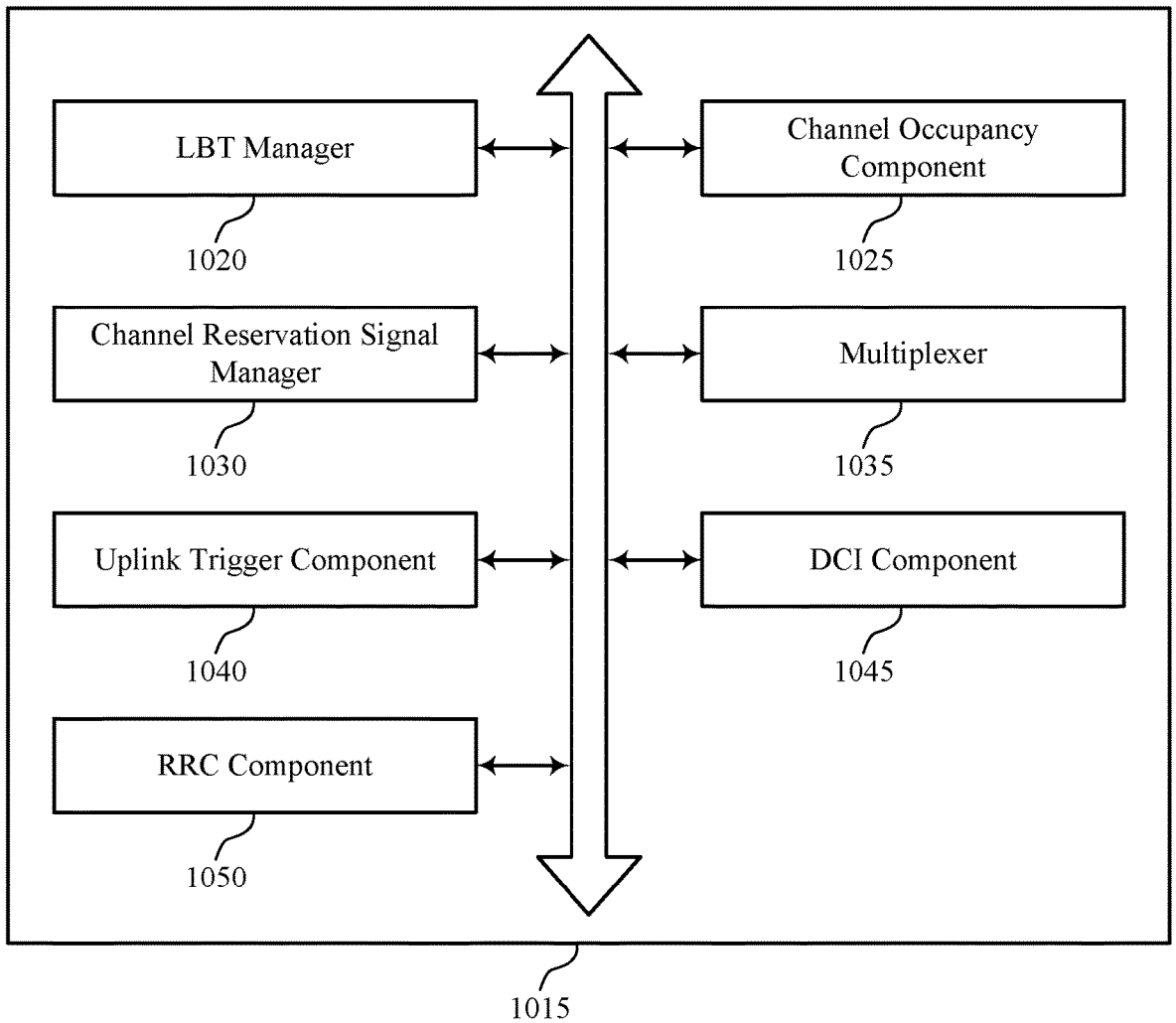

FIG. 10 shows a block diagram 1000 of a base station communications manager 1015 that supports channel reservation transmission schemes in shared radio frequency spectrum in accordance with aspects of the present disclosure. The base station communications manager 1015 may be an example of aspects of a base station communications manager 815, a base station communications manager 915, or a base station communications manager 1115 described with reference to FIGS. 8, 9, and 11. The base station communications manager 1015 may include LBT manager 1020, channel occupancy component 1025, channel reservation signal manager 1030, multiplexer 1035, uplink trigger component 1040, DCI component 1045, and radio resource control (RRC) component 1050. Each of these modules may communicate, directly or indirectly, with one another (e.g., via one or more buses).

LBT manager 1020 may perform an LBT procedure to identify that a channel in a shared radio frequency spectrum band is available for a first transmission. LBT manager 1020 may, for example, perform a CCA to determine that the channel is available for transmissions. Channel occupancy component 1025 may identify a time duration that the channel is to be occupied by the first transmission. The time duration may be identified, for example, based on a number of transmission frames or transmission time intervals (TTIs) that may be present in a transmission opportunity (TxOP).

Channel reservation signal manager 1030 may generate a channel reservation signal having a payload that indicates the time duration, and transmit the channel reservation signal. In some cases, channel reservation signal manager 1030 may align at least a portion of the channel reservation signal with a boundary of a control resource set (CORESET) transmission associated with the first transmission. In some cases, channel reservation signal manager 1030 may transmit repeated versions of the channel reservation signal, and modify the time duration indicated in the payload for each repeated transmission of the payload. In some cases, the generating the channel reservation signal further includes identifying a channel reservation signal preamble, determining a time difference between a completion of the LBT procedure and the boundary of the control resource set transmission, adjusting a duration of a dynamic cyclic prefix based on the channel reservation signal preamble and the time difference, and appending the dynamic cyclic prefix and payload to the channel reservation signal preamble. In some cases, the transmitting the channel reservation signal further includes repeating transmitting at least the payload until a transmission of the control resource set transmission associated with the first transmission. In some cases, the generating the channel reservation signal further includes formatting the payload of the channel reservation signal according to a downlink control channel format of the first transmission. In some cases, the generating the channel reservation signal further includes formatting the payload of the channel reservation signal in a channel reservation DCI field that is transmitted with other DCI associated with the first transmission.

In some cases, multiplexer 1035 may multiplex the payload with the control resource set transmission. In some cases, the transmitting the channel reservation signal further includes multiplexing the payload with a set of control resource set transmissions in a transmission opportunity associated with the first transmission.

Uplink trigger component 1040 may provide, with the channel reservation signal a trigger to a user equipment (UE) to transmit the channel reservation signal in an uplink transmission of the UE that is associated with the first transmission. In some cases, the trigger to the UE is transmitted in DCI associated with the first transmission.

DCI component 1045 may transmit one or more of a search space or payload size associated with the channel reservation DCI. RRC component 1050 may indicate one or more of the search space or payload size in RRC signaling.

Figure 11:
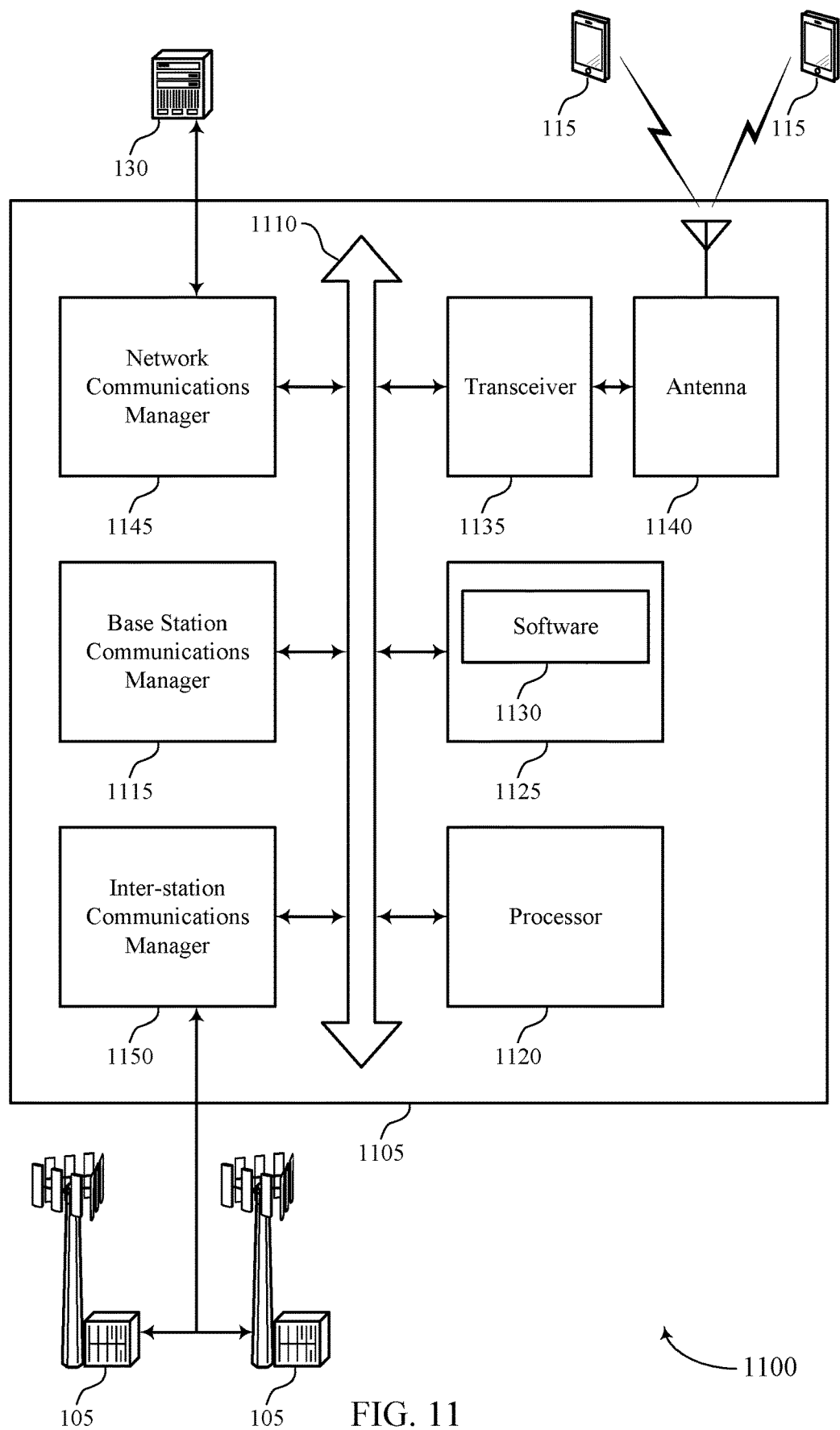
FIG. 11 illustrates a block diagram of a system including a base station that supports channel reservation transmission schemes in shared radio frequency spectrum in accordance with aspects of the present disclosure.

FIG. 11 shows a diagram of a system 1100 including a device 1105 that supports channel reservation transmission schemes in shared radio frequency spectrum in accordance with aspects of the present disclosure. Device 1105 may be an example of or include the components of wireless device 805, wireless device 905, or a base station 105 as described above, e.g., with reference to FIGS. 8 and 9. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting channel reservation transmission schemes in shared radio frequency spectrum).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support channel reservation transmission schemes in shared radio frequency spectrum. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
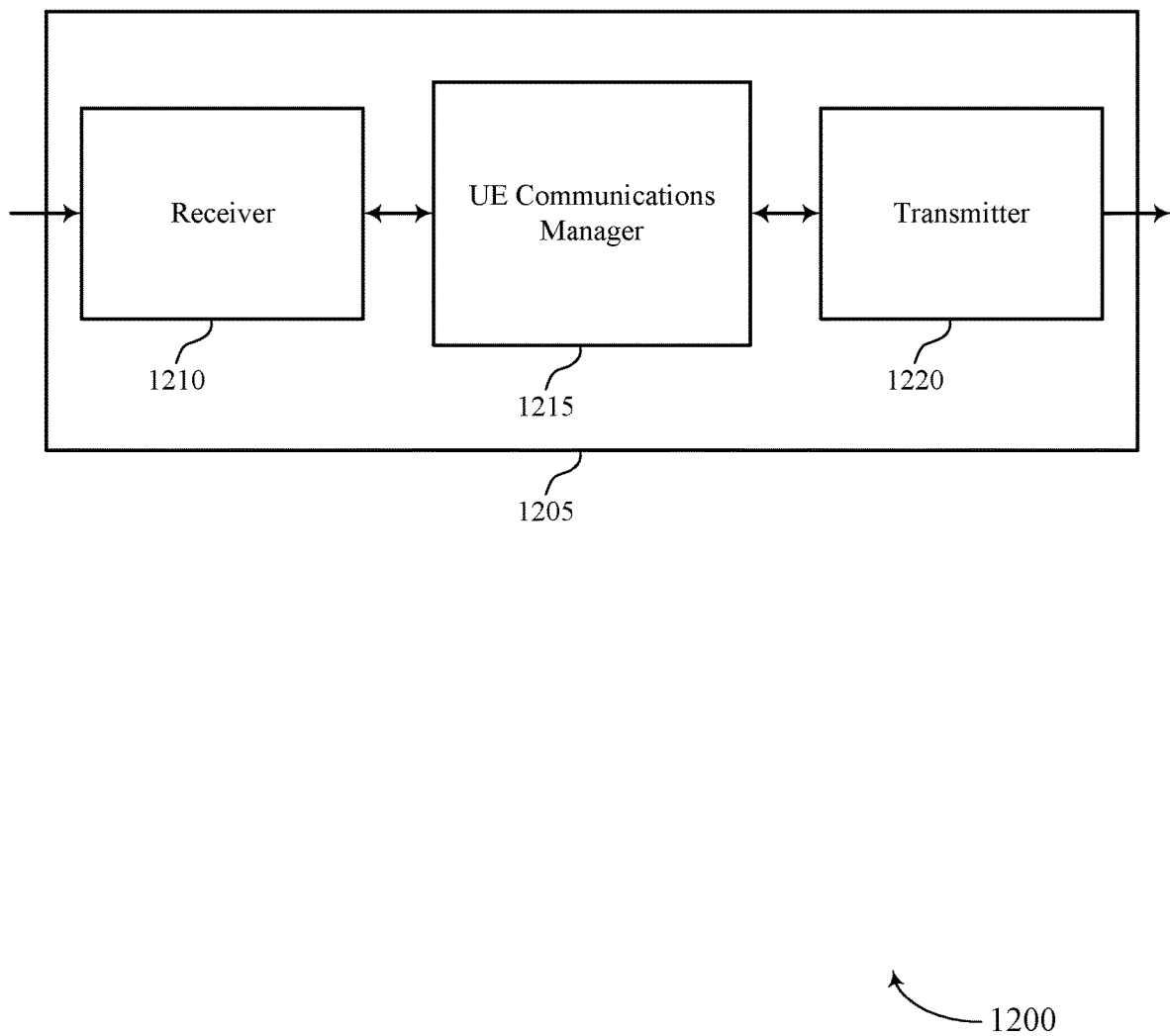
FIGS. 12 through 14 show block diagrams of a device that supports channel reservation transmission schemes in shared radio frequency spectrum in accordance with aspects of the present disclosure.

FIG. 12 shows a block diagram 1200 of a wireless device 1205 that supports channel reservation transmission schemes in shared radio frequency spectrum in accordance with aspects of the present disclosure. Wireless device 1205 may be an example of aspects of a UE 115 as described herein. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to channel reservation transmission schemes in shared radio frequency spectrum, etc.). Information may be passed on to other components of the device. The receiver 1210 may be an example of aspects of the transceiver 1535 described with reference to FIG. 15. The receiver 1210 may utilize a single antenna or a set of antennas.

UE communications manager 1215 may be an example of aspects of the UE communications manager 1515 described with reference to FIG. 15.

UE communications manager 1215 and/or at least some of its various sub-components may be implemented in hardware, software executed by a processor, firmware, or any combination thereof. If implemented in software executed by a processor, the functions of the UE communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1215 and/or at least some of its various sub-components may be physically located at various positions, including being distributed such that portions of functions are implemented at different physical locations by one or more physical devices. In some examples, UE communications manager 1215 and/or at least some of its various sub-components may be a separate and distinct component in accordance with various aspects of the present disclosure. In other examples, UE communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1215 may identify that a base station is transmitting a first transmission on a channel in a shared radio frequency spectrum band, receive a channel reservation signal from the base station, and identify a time duration that the channel is to be occupied by the first transmission based on a payload of the channel reservation signal.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
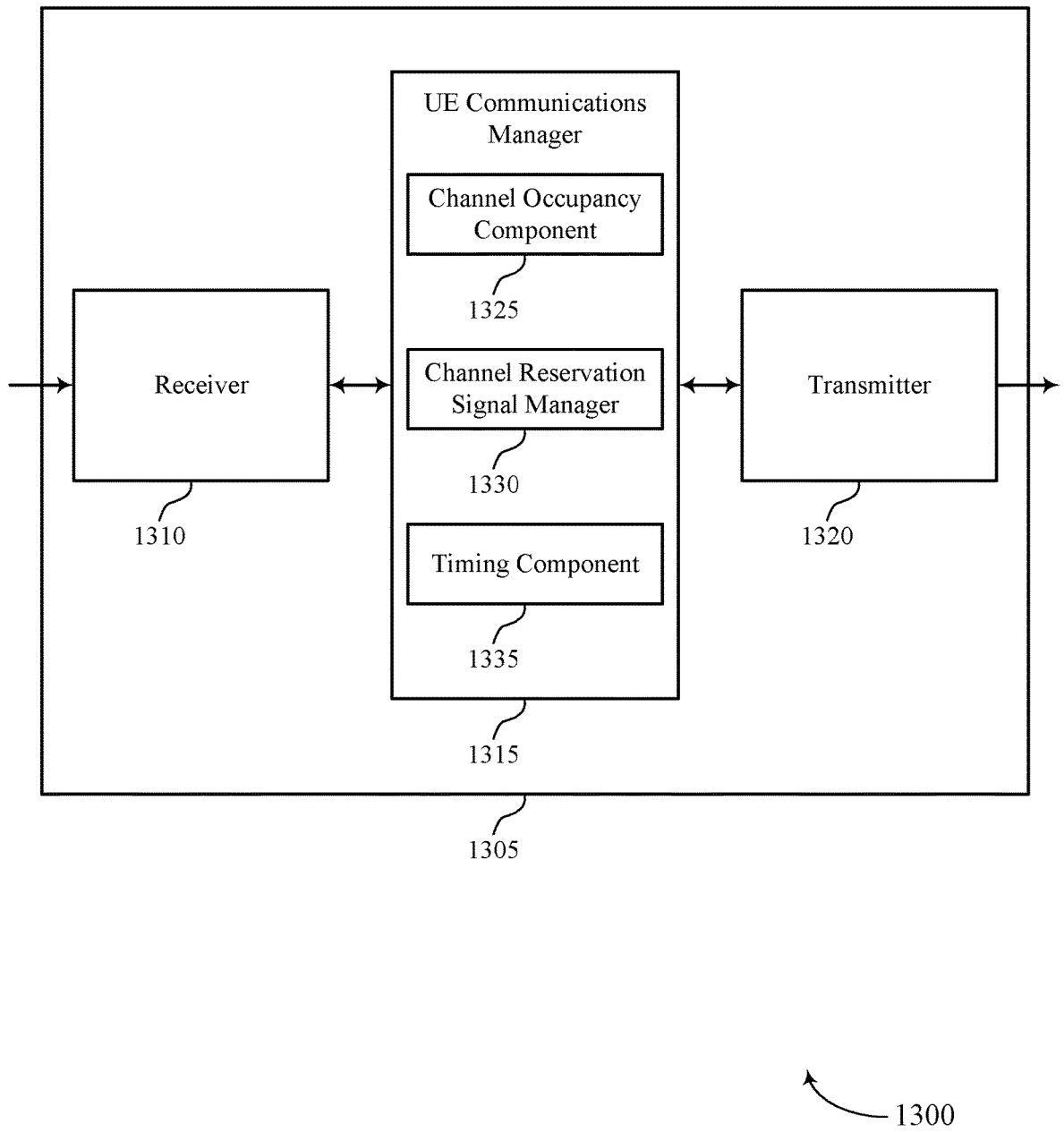

FIG. 13 shows a block diagram 1300 of a wireless device 1305 that supports channel reservation transmission schemes in shared radio frequency spectrum in accordance with aspects of the present disclosure. Wireless device 1305 may be an example of aspects of a wireless device 1205 or a UE 115 as described with reference to FIG. 12. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to channel reservation transmission schemes in shared radio frequency spectrum, etc.). Information may be passed on to other components of the device. The receiver 1310 may be an example of aspects of the transceiver 1535 described with reference to FIG. 15. The receiver 1310 may utilize a single antenna or a set of antennas.

UE communications manager 1315 may be an example of aspects of the UE communications manager 1515 described with reference to FIG. 15. UE communications manager 1315 may also include channel occupancy component 1325, channel reservation signal manager 1330, and timing component 1335.

Channel occupancy component 1325 may identify that a base station is transmitting a first transmission on a channel in a shared radio frequency spectrum band and discontinue monitoring the channel for at least a portion of the time duration.

Channel reservation signal manager 1330 may receive a channel reservation signal from the base station. Timing component 1335 may identify a time duration that the channel is to be occupied by the first transmission based on a payload of the channel reservation signal.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
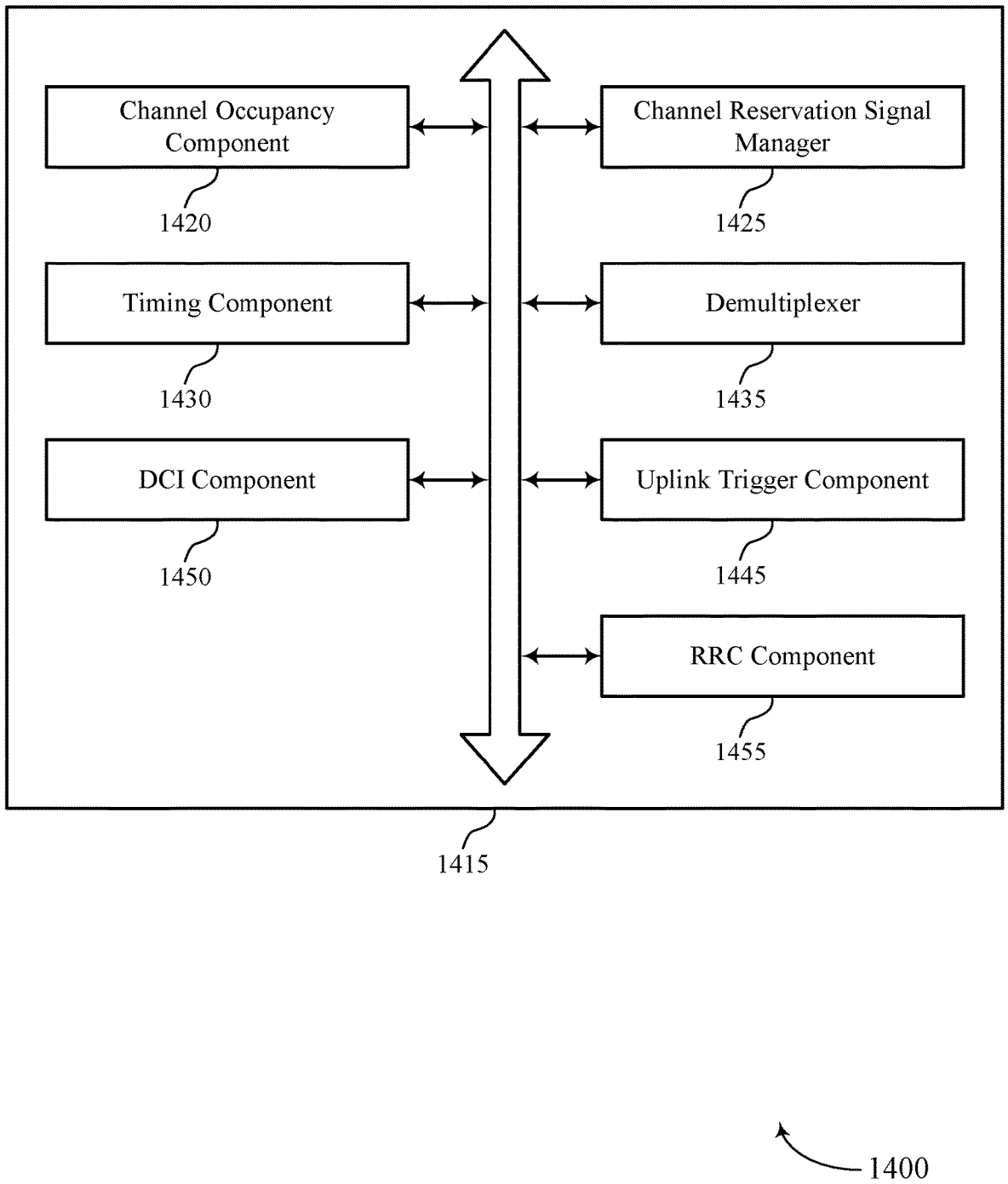

FIG. 14 shows a block diagram 1400 of a UE communications manager 1415 that supports channel reservation transmission schemes in shared radio frequency spectrum in accordance with aspects of the present disclosure. The UE communications manager 1415 may be an example of aspects of a UE communications manager 1515 described with reference to FIGS. 12, 13, and 15. The UE communications manager 1415 may include channel occupancy component 1420, channel reservation signal manager 1425, timing component 1430, demultiplexer 1435, uplink trigger component 1445, DCI component 1450, and RRC component 1455. Each of these modules may communicate, directly or indirectly, with one another (e.g., via one or more buses).

Channel occupancy component 1420 may identify that a base station is transmitting a first transmission on a channel in a shared radio frequency spectrum band and discontinue monitoring the channel for at least a portion of the time duration.

Channel reservation signal manager 1425 may receive a channel reservation signal from the base station. Timing component 1430 may identify a time duration that the channel is to be occupied by the first transmission based on a payload of the channel reservation signal. Demultiplexer 1435 may demultiplex the channel reservation signal from the control resource set transmission.

Uplink trigger component 1445 1445 may indicate that the UE is scheduled to transmit at least a portion of the channel reservation signal in an uplink transmission. In some cases, the channel reservation transmission from the UE is multiplexed with an uplink burst transmission associated with the first transmission.

DCI component 1450 may identify one or more of a search space mapping, aggregation level, or payload size associated with channel reservation DCI (CR-DCI), and the channel reservation signal may be received based on one or more of the search space, or aggregation level, or payload size. RRC component 1455 may receive one or more of the search space or payload size from the base station in RRC signaling.

Figure 15:
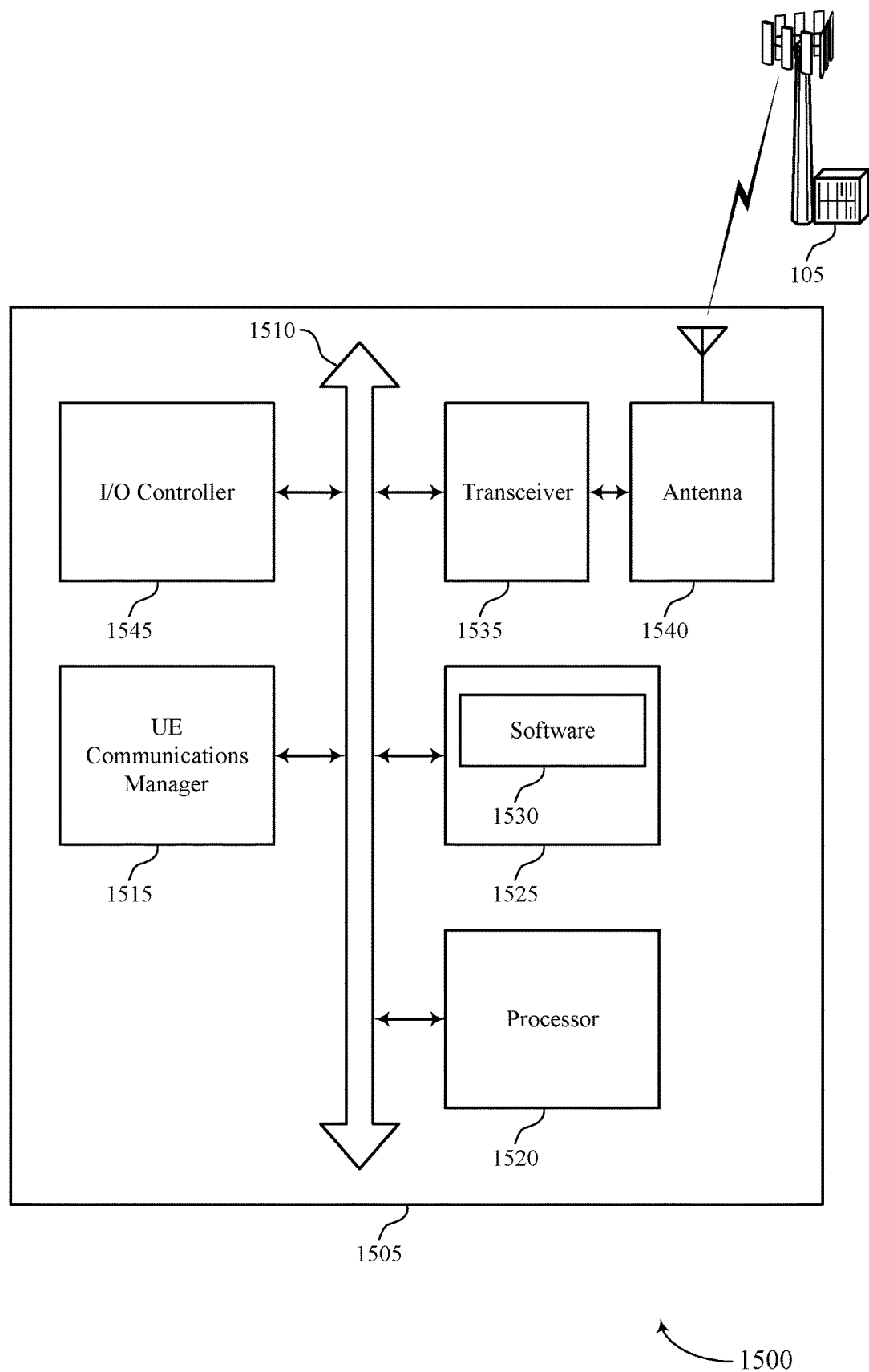
FIG. 15 illustrates a block diagram of a system including a UE that supports channel reservation transmission schemes in shared radio frequency spectrum in accordance with aspects of the present disclosure.

FIG. 15 shows a diagram of a system 1500 including a device 1505 that supports channel reservation transmission schemes in shared radio frequency spectrum in accordance with aspects of the present disclosure. Device 1505 may be an example of or include the components of UE 115 as described above, e.g., with reference to FIG. 1. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting channel reservation transmission schemes in shared radio frequency spectrum).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support channel reservation transmission schemes in shared radio frequency spectrum. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
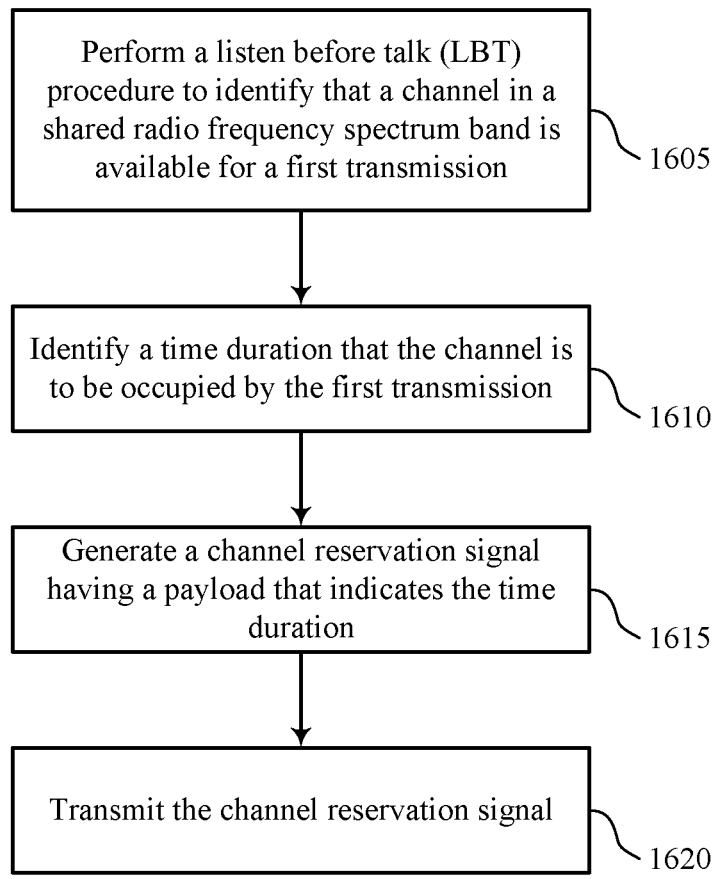
FIGS. 16 through 19 illustrate methods for channel reservation transmission schemes in shared radio frequency spectrum in accordance with aspects of the present disclosure.

FIG. 16 shows a flowchart illustrating a method 1600 for channel reservation transmission schemes in shared radio frequency spectrum in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may perform an LBT procedure to identify that a channel in a shared radio frequency spectrum band is available for a first transmission. The operations of block 1605 may be performed according to the methods described herein. In certain examples, aspects of the operations of block 1605 may be performed by an LBT manager as described with reference to FIGS. 8 through 11.

At block 1610 the base station 105 may identify a time duration that the channel is to be occupied by the first transmission. The operations of block 1610 may be performed according to the methods described herein. In certain examples, aspects of the operations of block 1610 may be performed by a channel occupancy component as described with reference to FIGS. 8 through 11.

At block 1615 the base station 105 may generate a channel reservation signal having a payload that indicates the time duration. The operations of block 1615 may be performed according to the methods described herein. In certain examples, aspects of the operations of block 1615 may be performed by a channel reservation signal manager as described with reference to FIGS. 8 through 11.

At block 1620 the base station 105 may transmit the channel reservation signal. The operations of block 1620 may be performed according to the methods described herein. In certain examples, aspects of the operations of block 1620 may be performed by a channel reservation signal manager as described with reference to FIGS. 8 through 11.

Figure 17:
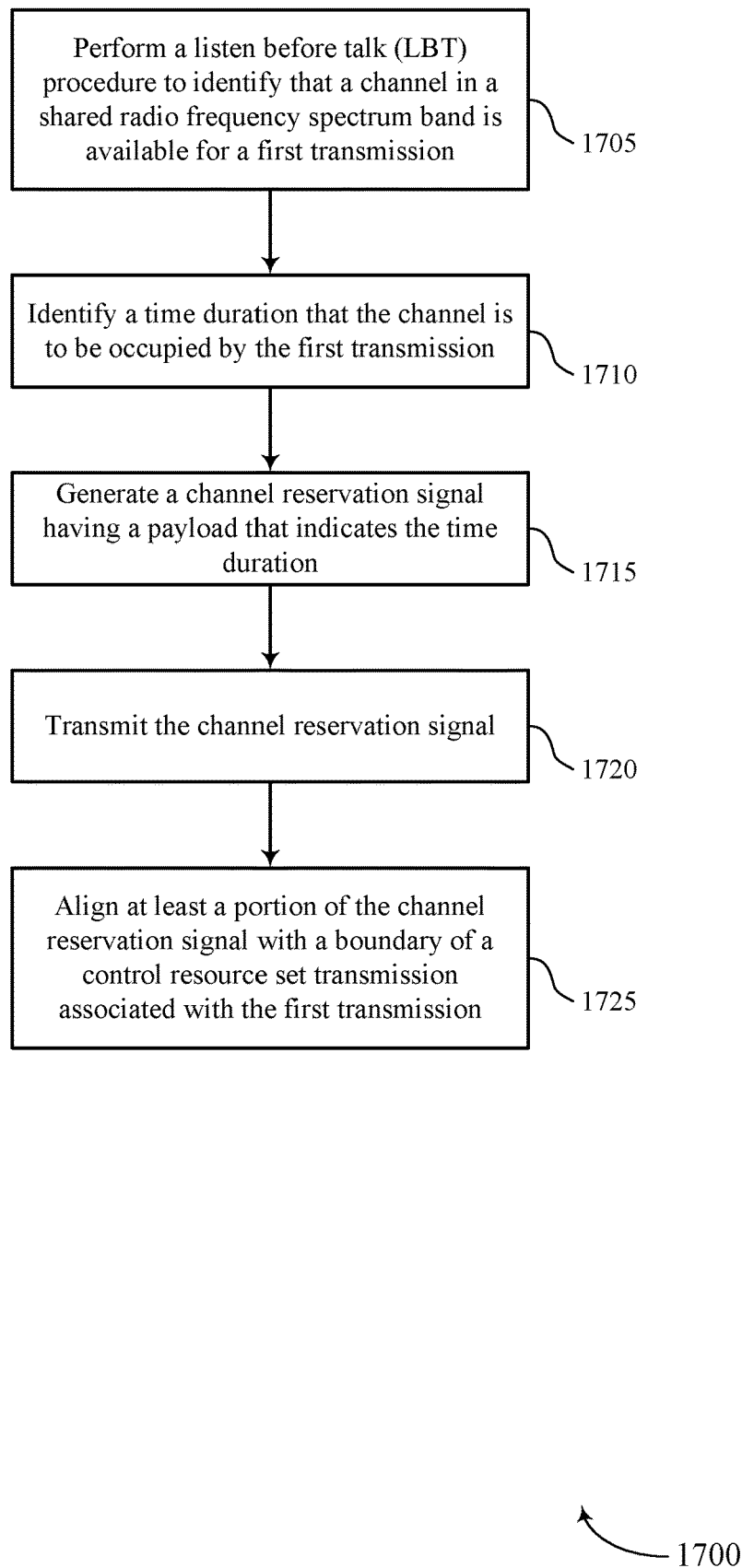

FIG. 17 shows a flowchart illustrating a method 1700 for channel reservation transmission schemes in shared radio frequency spectrum in accordance with aspects of the present disclosure. The operations of method 1700 may be implemented by a base station 105 or its components as described herein. For example, the operations of method 1700 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may perform an LBT procedure to identify that a channel in a shared radio frequency spectrum band is available for a first transmission. The operations of block 1705 may be performed according to the methods described herein. In certain examples, aspects of the operations of block 1705 may be performed by an LBT manager as described with reference to FIGS. 8 through 11.

At block 1710 the base station 105 may identify a time duration that the channel is to be occupied by the first transmission. The operations of block 1710 may be performed according to the methods described herein. In certain examples, aspects of the operations of block 1710 may be performed by a channel occupancy component as described with reference to FIGS. 8 through 11.

At block 1715 the base station 105 may generate a channel reservation signal having a payload that indicates the time duration. The operations of block 1715 may be performed according to the methods described herein. In certain examples, aspects of the operations of block 1715 may be performed by a channel reservation signal manager as described with reference to FIGS. 8 through 11.

At block 1720 the base station 105 may transmit the channel reservation signal. The operations of block 1720 may be performed according to the methods described herein. In certain examples, aspects of the operations of block 1720 may be performed by a channel reservation signal manager as described with reference to FIGS. 8 through 11.

At block 1725 the base station 105 may align at least a portion of the channel reservation signal with a symbol boundary of a control resource set transmission associated with the first transmission. The operations of block 1725 may be performed according to the methods described herein. In certain examples, aspects of the operations of block 1725 may be performed by a channel reservation signal manager as described with reference to FIGS. 8 through 11.

Figure 18:
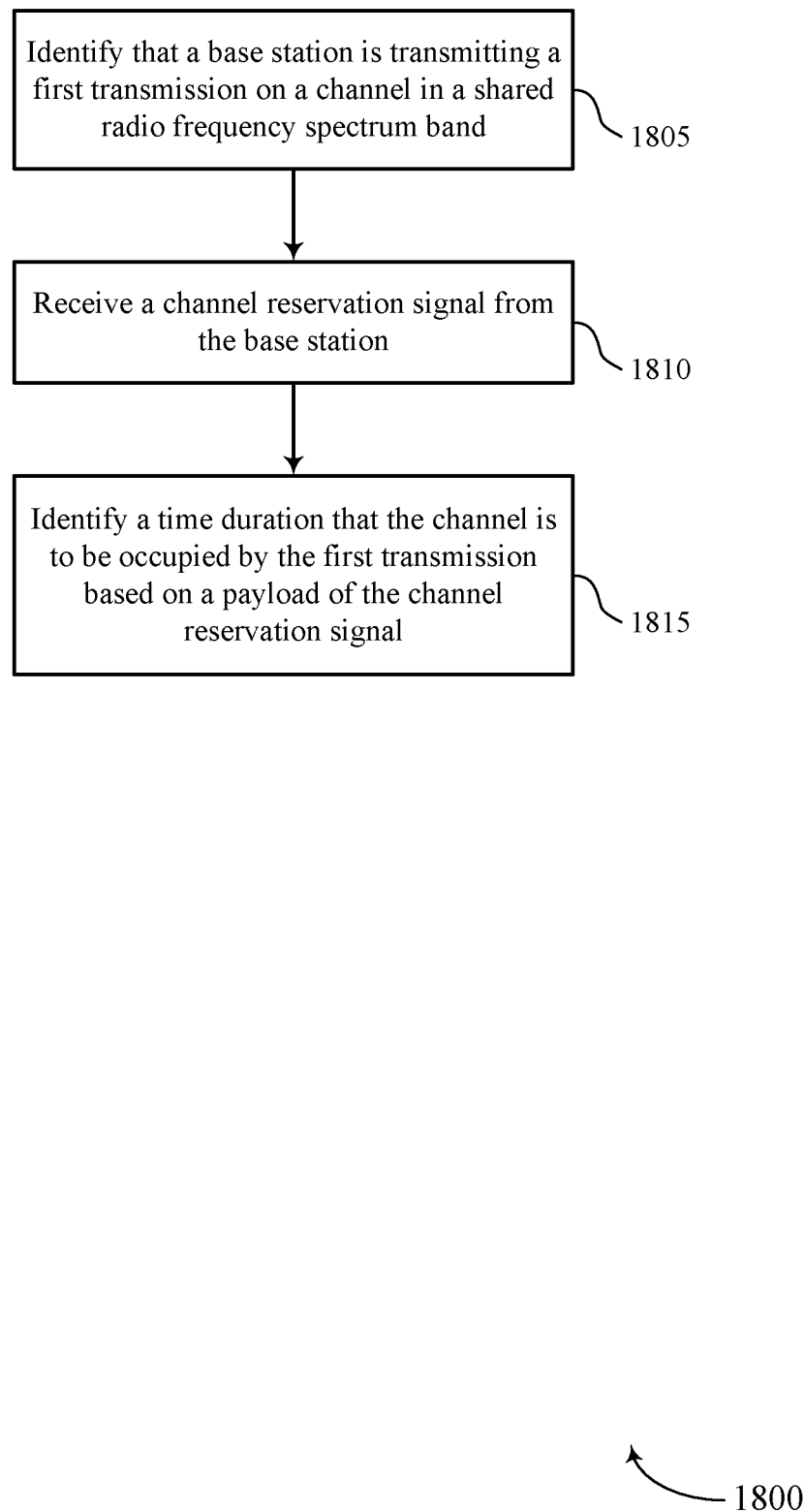

FIG. 18 shows a flowchart illustrating a method 1800 for channel reservation transmission schemes in shared radio frequency spectrum in accordance with aspects of the present disclosure. The operations of method 1800 may be implemented by a UE 115 or its components as described herein. For example, the operations of method 1800 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify that a base station is transmitting a first transmission on a channel in a shared radio frequency spectrum band. The operations of block 1805 may be performed according to the methods described herein. In certain examples, aspects of the operations of block 1805 may be performed by a channel occupancy component as described with reference to FIGS. 12 through 15.

At block 1810 the UE 115 may receive a channel reservation signal from the base station. The operations of block 1810 may be performed according to the methods described herein. In certain examples, aspects of the operations of block 1810 may be performed by a channel reservation signal manager as described with reference to FIGS. 12 through 15.

At block 1815 the UE 115 may identify a time duration that the channel is to be occupied by the first transmission based at least in part on a payload of the channel reservation signal. The operations of block 1815 may be performed according to the methods described herein. In certain examples, aspects of the operations of block 1815 may be performed by a timing component as described with reference to FIGS. 12 through 15.

Figure 19:
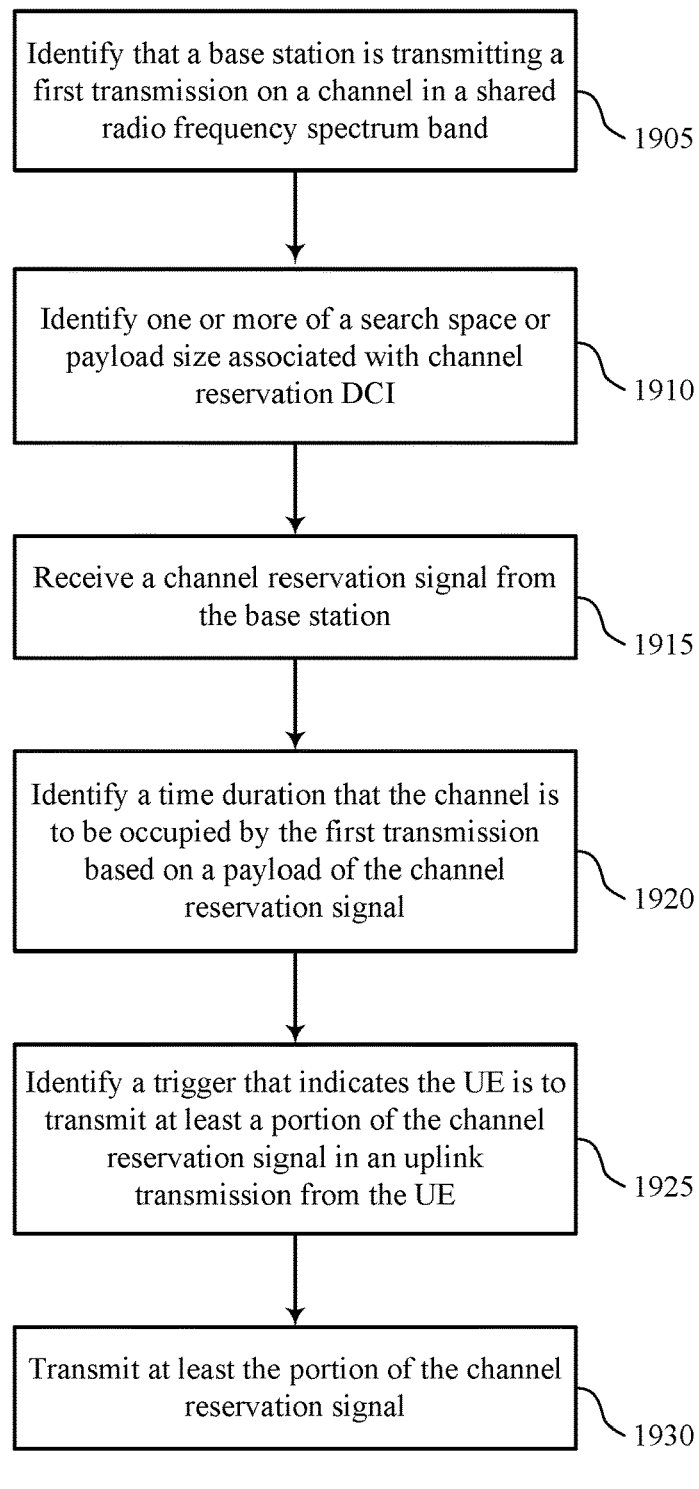

FIG. 19 shows a flowchart illustrating a method 1900 for channel reservation transmission schemes in shared radio frequency spectrum in accordance with aspects of the present disclosure. The operations of method 1900 may be implemented by a UE 115 or its components as described herein. For example, the operations of method 1900 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify that a base station is transmitting a first transmission on a channel in a shared radio frequency spectrum band. The operations of block 1905 may be performed according to the methods described herein. In certain examples, aspects of the operations of block 1905 may be performed by a channel occupancy component as described with reference to FIGS. 12 through 15.

At block 1910 the UE 115 may identify one or more of a search space or payload size associated with channel reservation DCI. The operations of block 1910 may be performed according to the methods described herein. In certain examples, aspects of the operations of block 1910 may be performed by a DCI component as described with reference to FIGS. 12 through 15.

At block 1915 the UE 115 may receive a channel reservation signal from the base station. In some cases, the channel reservation signal may be received based at least in part on one or more of the search space or payload size. The operations of block 1915 may be performed according to the methods described herein. In certain examples, aspects of the operations of block 1915 may be performed by a channel reservation signal manager as described with reference to FIGS. 12 through 15.

At block 1920 the UE 115 may identify a time duration that the channel is to be occupied by the first transmission based at least in part on a payload of the channel reservation signal. The operations of block 1920 may be performed according to the methods described herein. In certain examples, aspects of the operations of block 1920 may be performed by a timing component as described with reference to FIGS. 12 through 15.

At block 1925 the UE 115 may identify a trigger that indicates the UE is to transmit at least a portion of the channel reservation signal in an uplink transmission from the UE. The operations of block 1925 may be performed according to the methods described herein. In certain examples, aspects of the operations of block 1925 may be performed by an uplink trigger component as described with reference to FIGS. 12 through 15.

At block 1930 the UE 115 may transmit at least the portion of the channel reservation signal. The operations of block 1930 may be performed according to the methods described herein. In certain examples, aspects of the operations of block 1930 may be performed by a channel reservation signal manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    performing a listen before talk (LBT) procedure to identify that a channel in a shared radio frequency spectrum band is available for a first transmission;
    identifying a time duration that the channel is to be occupied by the first transmission;
    generating a channel reservation signal having a payload that indicates the time duration;
    aligning at least a portion of the channel reservation signal with a boundary of a control resource set transmission associated with the first transmission; and
    transmitting the channel reservation signal.

2. The method of claim 1, wherein the generating of the channel reservation signal further comprises:
    identifying a channel reservation signal preamble;
    determining a time difference between a completion of the LBT procedure and the boundary of the control resource set transmission;
    adjusting a duration of a dynamic cyclic prefix based at least in part on the channel reservation signal preamble and the time difference; and
    appending the dynamic cyclic prefix and payload to the channel reservation signal preamble.

3. The method of claim 1, wherein the transmitting the channel reservation signal further comprises:
    multiplexing the payload with the control resource set transmission.

4. The method of claim 1, wherein the transmitting the channel reservation signal further comprises:
    repeating transmitting at least the payload until a transmission of the control resource set transmission associated with the first transmission.

5. The method of claim 4, further comprising:
    modifying the time duration indicated in the payload for each repeated transmission of the payload.

6. The method of claim 1, wherein the transmitting the channel reservation signal further comprises:
    multiplexing the payload with a plurality of control resource set transmissions in a transmission opportunity associated with the first transmission.

7. The method of claim 1, wherein the transmitting the channel reservation signal further comprises:

transmitting a trigger to a UE to transmit the channel reservation signal in an uplink transmission of the UE that is associated with the first transmission.

8. The method of claim 7, wherein the trigger to the UE is transmitted in downlink control information (DCI) associated with the first transmission.

9. The method of claim 1, wherein the generating the channel reservation signal further comprises:
formatting the payload of the channel reservation signal according to a downlink control channel format of the first transmission.

10. The method of claim 1, wherein the generating the channel reservation signal further comprises:
formatting the payload of the channel reservation signal in a channel reservation downlink control information (DCI) field that is transmitted with other DCI associated with the first transmission.

11. The method of claim 10, further comprising:
transmitting one or more of a search space or payload size associated with the channel reservation DCI.

12. The method of claim 11, wherein one or more of the search space or payload size is transmitted in radio resource control (RRC) signaling.

13. A method for wireless communication, comprising:
identifying that a base station is transmitting a first transmission on a channel in a shared radio frequency spectrum band;
receiving a channel reservation signal from the base station, wherein at least a portion of the channel reservation signal is aligned with a boundary of a control resource set transmission associated with the first transmission; and
identifying a time duration that the channel is to be occupied by the first transmission based at least in part on a payload of the channel reservation signal.

14. The method of claim 13, further comprising:
discontinuing monitoring the channel for at least a portion of the time duration.

15. The method of claim 13, wherein the receiving the channel reservation signal further comprises:
receiving the control resource set transmission from the base station; and
demultiplexing the channel reservation signal from the control resource set transmission.

16. The method of claim 13, wherein the method is performed by a user equipment (UE), and wherein the method further comprises:
identifying a trigger that indicates the UE is to transmit at least a portion of the channel reservation signal in an uplink transmission from the UE; and
transmitting at least the portion of the channel reservation signal.

17. The method of claim 16, wherein the uplink transmission from the UE is an uplink burst transmission associated with the first transmission.

18. The method of claim 13, further comprising:
identifying one or more of a search space or payload size associated with channel reservation DCI, and wherein the receiving the channel reservation signal is based at least in part on one or more of the search space or payload size.

19. The method of claim 18, wherein one or more of the search space or payload size is received from the base station in RRC signaling.

20. An apparatus for wireless communication, comprising:
a processor;
memory in electronic communication with the processor; and
instructions stored in the memory and operable, when executed by the processor, to cause the apparatus to:
perform a listen before talk (LBT) procedure to identify that a channel in a shared radio frequency spectrum band is available for a first transmission;
identify a time duration that the channel is to be occupied by the first transmission;
generate a channel reservation signal having a payload that indicates the time duration;
align at least a portion of the channel reservation signal with a boundary of a control resource set transmission associated with the first transmission; and
transmit the channel reservation signal.

21. The apparatus of claim 20, wherein the instructions to generate the channel reservation signal are further executable by the processor to:
identify a channel reservation signal preamble;
determine a time difference between a completion of the LBT procedure and the boundary of the control resource set transmission;
adjust a duration of a dynamic cyclic prefix based at least in part on the channel reservation signal preamble and the time difference; and
append the dynamic cyclic prefix and payload to the channel reservation signal preamble.

22. The apparatus of claim 20, wherein the instructions to transmit the channel reservation signal are further executable by the processor to:
multiplex the payload with the control resource set transmission.

23. The apparatus of claim 20, wherein the instructions to transmit the channel reservation signal are further executable by the processor to:
repeat transmitting at least the payload until a transmission of the control resource set transmission associated with the first transmission.

24. An apparatus for wireless communication, comprising:
a processor;
memory in electronic communication with the processor; and
instructions stored in the memory and operable, when executed by the processor, to cause the apparatus to:
identify that a base station is transmitting a first transmission on a channel in a shared radio frequency spectrum band;
receive a channel reservation signal from the base station, wherein at least a portion of the channel reservation signal is aligned with a boundary of a control resource set transmission associated with the first transmission; and
identify a time duration that the channel is to be occupied by the first transmission based at least in part on a payload of the channel reservation signal.

25. The apparatus of claim 24, wherein the instructions are further executable by the processor to:
discontinue monitoring the channel for at least a portion of the time duration.

26. The apparatus of claim 24, wherein the instructions to receive the channel reservation signal are further executable by the processor to:
receive the control resource set transmission from the base station; and
demultiplex the channel reservation signal from the control resource set transmission.

27. The apparatus of claim 24, wherein the instructions are further executable by the processor to:
- identify a trigger that indicates a user equipment (UE) is to transmit at least a portion of the channel reservation signal in an uplink transmission from the UE; and
- transmit at least the portion of the channel reservation signal.

28. The apparatus of claim 27, wherein the uplink transmission from the UE is an uplink burst transmission associated with the first transmission.

* * * * *